US012621123B2

(12) United States Patent
Hoshizuki et al.

(10) Patent No.: US 12,621,123 B2
(45) Date of Patent: May 5, 2026

(54) ENCRYPTION PROCESSING APPARATUS AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 172 days.

(21) Appl. No.: 18/658,512

(22) Filed: May 8, 2024

(65) Prior Publication Data

US 2026/0019231 A1     Jan. 15, 2026

(51) Int. Cl.
*H04L 9/06* (2006.01)
*H04L 9/00* (2022.01)

(52) U.S. Cl.
CPC ............ *H04L 9/0618* (2013.01); *H04L 9/008* (2013.01)

(58) Field of Classification Search
CPC .......... H04L 9/0618; H04L 9/008; H04L 9/06
See application file for complete search history.

(56) References Cited

U.S. PATENT DOCUMENTS

2022/0052848 A1* 2/2022 Kang ...................... G06F 17/17

OTHER PUBLICATIONS

I. Chillotti et al. "TFHE: Fast Fully Homomorphic Encryption over the Torus" Journal of Cryptology, 33:34-91, 2020 (62 pages).
H. Okada et al. "Integerwise Functional Bootstrapping on TFHE" International Conference on Information Security; pp. 107-125, 2020 (19 pages).

* cited by examiner

*Primary Examiner* — Quazi Farooqui
(74) *Attorney, Agent, or Firm* — Osha Bergman Watanabe & Burton LLP

(57)     ABSTRACT

In order to realize four arithmetic operations in Integer-wise type TFHE, an encryption processing apparatus that processes a ciphertext is provided, the ciphertext being a fully homomorphic ciphertext that has, as a plaintext associated with an integer, a value with an error having a predetermined variance added thereto within a predetermined value range and that is able to be subjected to a predetermined operation between integers without being decrypted. The apparatus includes applying a first polynomial in which all coefficients are the same to an operation result of a homomorphic operation between a ciphertext based on a first ciphertext (ca) and a ciphertext based on a second ciphertext (cb), to obtain a third ciphertext (cd) indicating a position of a plaintext in the operation result, and applying a predetermined polynomial to a ciphertext obtained by reducing a range of plaintext to a predetermined range in the value range by homomorphic addition of the third ciphertext to the operation result, to perform an operation between the first ciphertext and the second ciphertext.

14 Claims, 16 Drawing Sheets

$(a+b), (a-b)$ (a+b), (a-b)

$(a+b)^2/4, (a-b)^2/4$ $(a+b)^2/4-(a-b)^2/4$

FIG.7
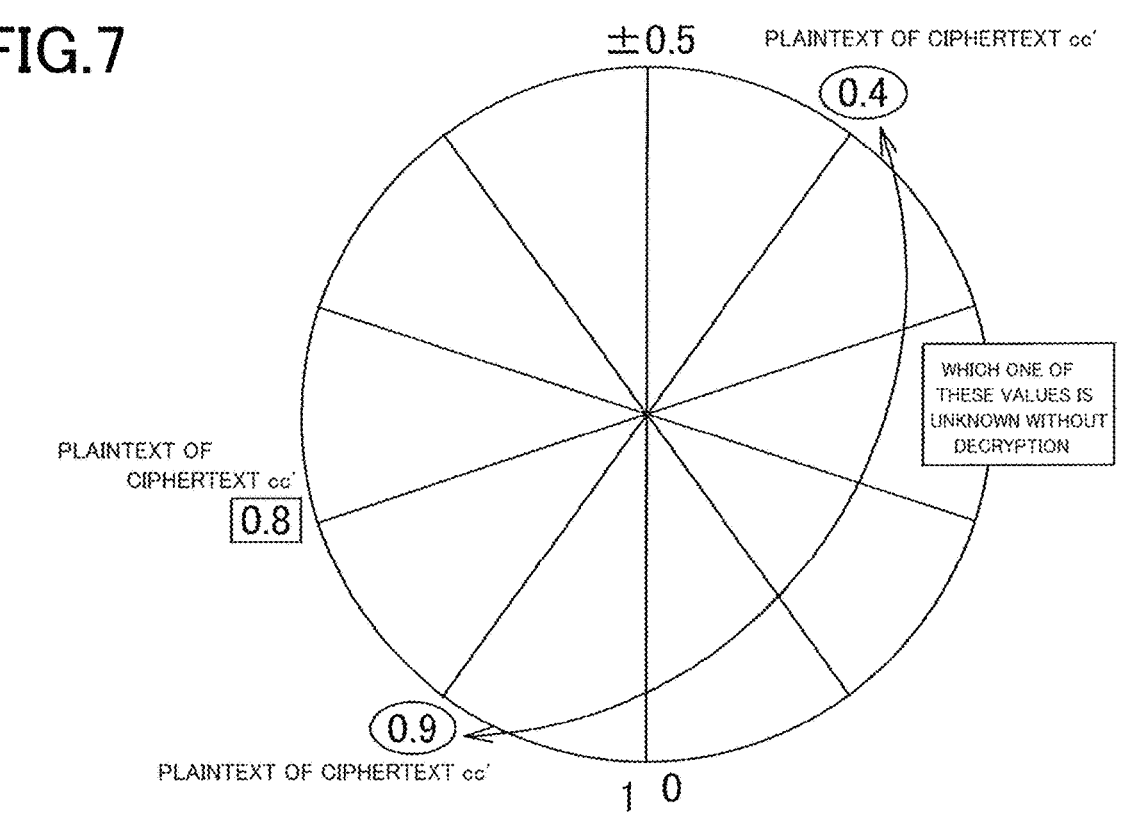
FIG.8A
FIG.8B
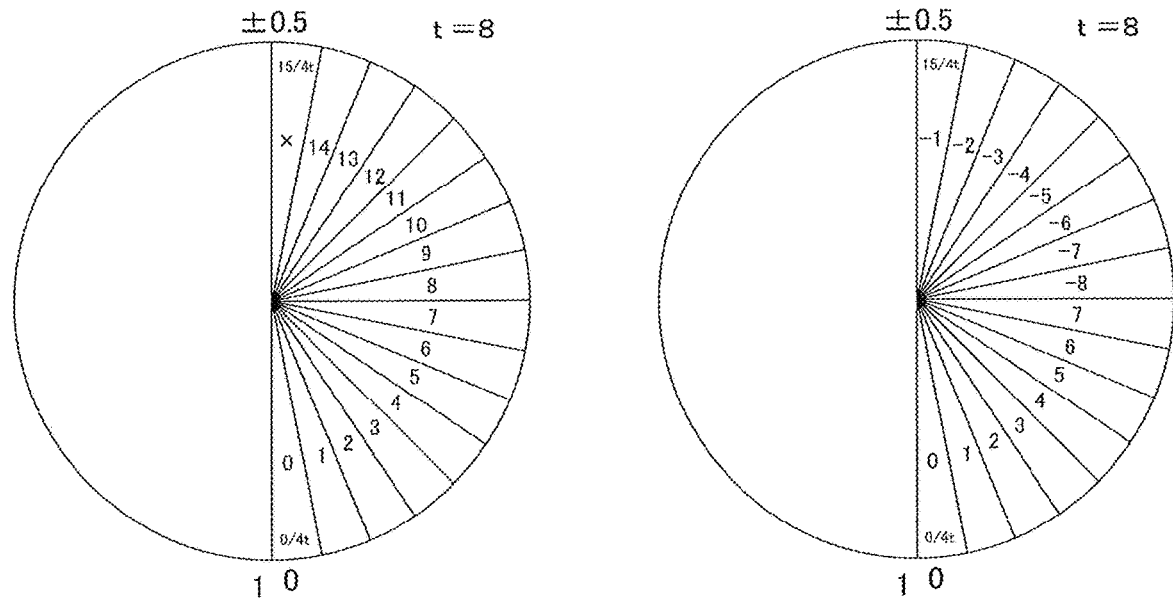

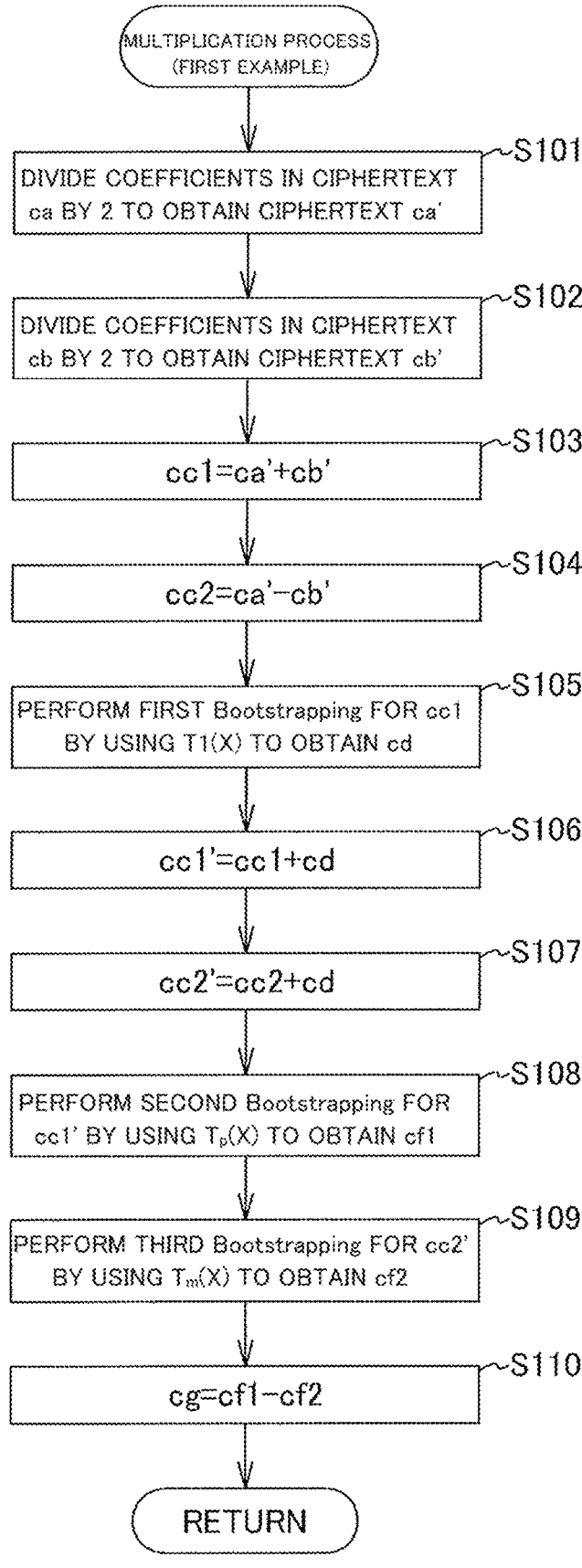

MULTIPLICATION PROCESS
(FIRST EXAMPLE)

S101
DIVIDE COEFFICIENTS IN CIPHERTEXT
ca BY 2 TO OBTAIN CIPHERTEXT ca'

S102
DIVIDE COEFFICIENTS IN CIPHERTEXT
cb BY 2 TO OBTAIN CIPHERTEXT cb'

S103
$cc1=ca'+cb'$

S104
$cc2=ca'-cb'$

S105
PERFORM FIRST Bootstrapping FOR cc1
BY USING T1(X) TO OBTAIN cd

S106
$cc1'=cc1+cd$

S107
$cc2'=cc2+cd$

S108
PERFORM SECOND Bootstrapping FOR
cc1' BY USING $T_p(X)$ TO OBTAIN cf1

S109
PERFORM THIRD Bootstrapping FOR cc2'
BY USING $T_m(X)$ TO OBTAIN cf2

S110
$cg=cf1-cf2$

RETURN

FIG.12

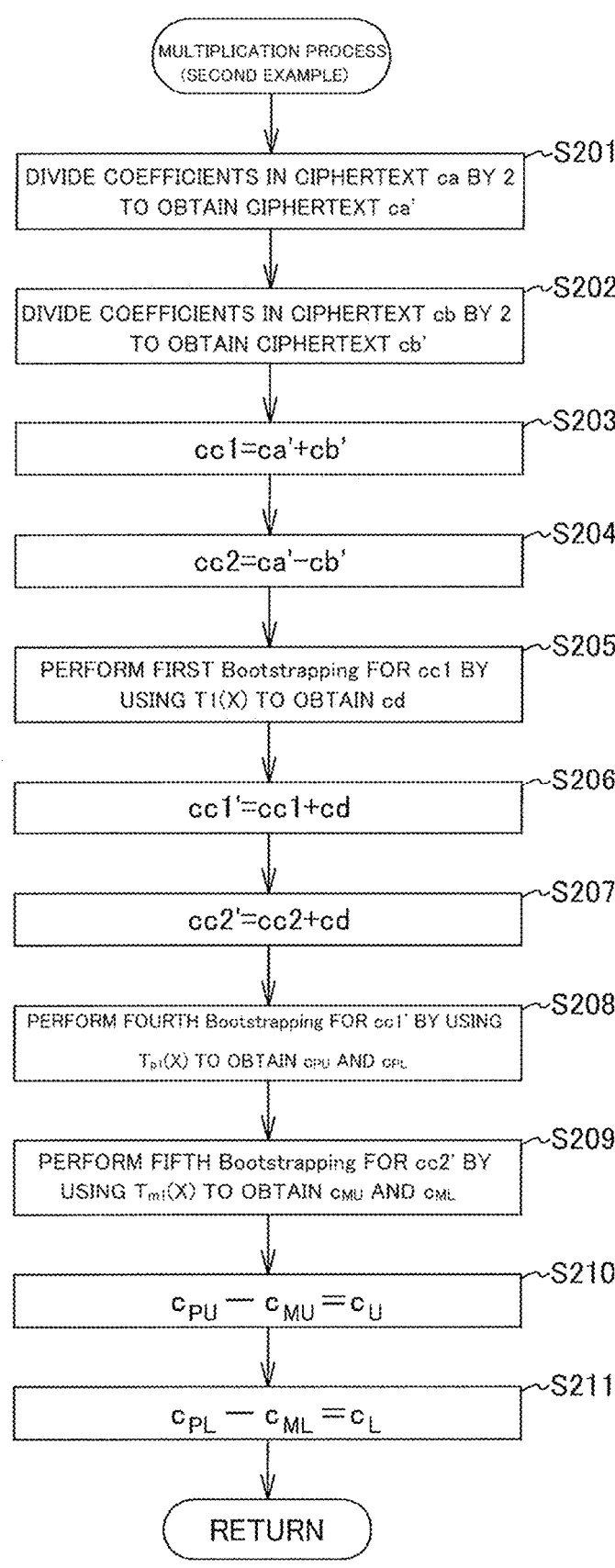

MULTIPLICATION PROCESS (SECOND EXAMPLE)

S201 — DIVIDE COEFFICIENTS IN CIPHERTEXT ca BY 2 TO OBTAIN CIPHERTEXT ca'

S202 — DIVIDE COEFFICIENTS IN CIPHERTEXT cb BY 2 TO OBTAIN CIPHERTEXT cb'

S203 — $cc1=ca'+cb'$

S204 — $cc2=ca'-cb'$

S205 — PERFORM FIRST Bootstrapping FOR cc1 BY USING T1(X) TO OBTAIN cd

S206 — $cc1'=cc1+cd$

S207 — $cc2'=cc2+cd$

S208 — PERFORM FOURTH Bootstrapping FOR cc1' BY USING $T_{pl}(X)$ TO OBTAIN $c_{PU}$ AND $c_{PL}$ S209 — PERFORM FIFTH Bootstrapping FOR cc2' BY USING $T_{ml}(X)$ TO OBTAIN $c_{MU}$ AND $c_{ML}$ S210 — $c_{PU} - c_{MU} = c_U$ S211 — $c_{PL} - c_{ML} = c_L$

RETURN $(a+b)$, $(a-b)$

ENCRYPTION PROCESSING APPARATUS AND ENCRYPTION PROCESSING METHOD

CROSS-REFERENCE TO RELATED APPLICATION

This application is based upon and claims the benefit of priorities to Japanese Patent Application No. 2023-83822, filed on May 22, 2023, and Japanese Patent Application No. 2024-025934, filed on Feb. 22, 2024, with the Japanese Patent Office, the entire contents of which are incorporated herein by reference in its entirety.

FIELD

The embodiments discussed herein are related to an encryption processing apparatus, an encryption processing method, and a non-transitory computer-readable recording medium.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are conventionally known additive homomorphic encryption that performs only an additive operation (addition and subtraction) while a finite cyclic group is regarded as an integer and multiplicative homomorphic encryption that performs only a multiplicative operation (multiplication) while a finite cyclic group is regarded as an integer.

For the finite cyclic group, an integral multiple can be obtained by repeating addition, and therefore an integral multiple by a plaintext can be calculated. Also, exponentiation by a plaintext can be calculated by repeating multiplication.

There are also known ring homomorphic encryption that processes both an additive operation and a multiplicative operation while ciphertexts remain encrypted and fully homomorphic encryption (FHE) that allows all arithmetic operations including addition and multiplication.

One of known fully homomorphic encryption techniques is fully homomorphic encryption based on the LWE (Learning with Errors) problem, which is configured by adding a small error to a plaintext in an encryption process to such an extent that there is no problem in decryption.

In the fully homomorphic encryption based on the LWE problem, an error is accumulated as an operation is repeated, and therefore, bootstrapping for reducing an error component while the error component remains encrypted is performed before the error becomes too large to allow decryption.

The computation time of bootstrapping occupies most of the computation time required when an operation is performed by fully homomorphic encryption. Further, the amount of computation is large in bootstrapping, because bootstrapping handles a large amount of data. Therefore, in the operation of fully homomorphic encryption, there is a problem that the operation result cannot be obtained within a practical time.

A scheme that drastically improves this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "aforementioned paper" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in the "aforementioned paper" is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as the plaintext (for example, Integerwise Functional Bootstrapping on TFHE, 2020, Hiroki Okada, Shinsaku Kiyomoto, and Carlos Cid).

If TFHE can be used as homomorphic encryption that enables four arithmetic operations to be performed in an Integer-wise manner, more efficient processing can be performed as compared with bit-by-bit computation.

A TLWE ciphertext used in TFHE is shown by the aforementioned paper as being an additive homomorphic type for a plaintext on a circle group, and it is obvious that addition (subtraction) can be performed. Meanwhile, as for multiplication, although multiplication between an integer and a circle group (a ciphertext) is defined because the circle group is a Z-module, a multiplicative operation between circle groups is not obvious because it is not defined.

It is an object of an aspect of the present invention to enable multiplication between ciphertexts, and to fully realize four arithmetic operations in Integer-wise TFHE.

SUMMARY

According to an aspect of the present invention, an encryption processing apparatus processes a ciphertext, the ciphertext being a fully homomorphic ciphertext that has, as a plaintext associated with an integer, a value with an error having a predetermined variance added thereto within a predetermined value range and that is able to be subjected to a predetermined operation between integers without being decrypted, the apparatus including a processor that performs a process including: applying a first polynomial in which all coefficients are the same to an operation result of a homomorphic operation between a ciphertext based on a first ciphertext and a ciphertext based on a second ciphertext, to obtain a third ciphertext indicating a position of a plaintext in the operation result; and applying a predetermined polynomial to a ciphertext obtained by reducing a range of plaintext to a predetermined range in the value range by a homomorphic addition of the third ciphertext to the operation result, to perform an operation between the first ciphertext and the second ciphertext.

According to an aspect of the present invention, it is possible to realize Integer-wise type TFHE four arithmetic operations in a complete form.

The objects and advantages of the invention will be realized and achieved by the elements and combinations specifically pointed out in the claims. It is to be understood that both the foregoing general description and the following detailed description are exemplary and illustrative and are not intended to limit the invention as claimed.

BRIEF DESCRIPTION OF DRAWINGS

FIG. 7 is an explanatory diagram of Integer-wise type TFHE in the present embodiment;

FIGS. 8A and 8B are explanatory diagrams of Integer-wise type TFHE in the present embodiment;

FIG. 11 is a flowchart for explaining a multiplication process according to the first example of the present embodiment;

FIG. 12 is a flowchart for explaining a multiplication process according to the second example of the present embodiment;

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value operation.

First Example

Figure 1:
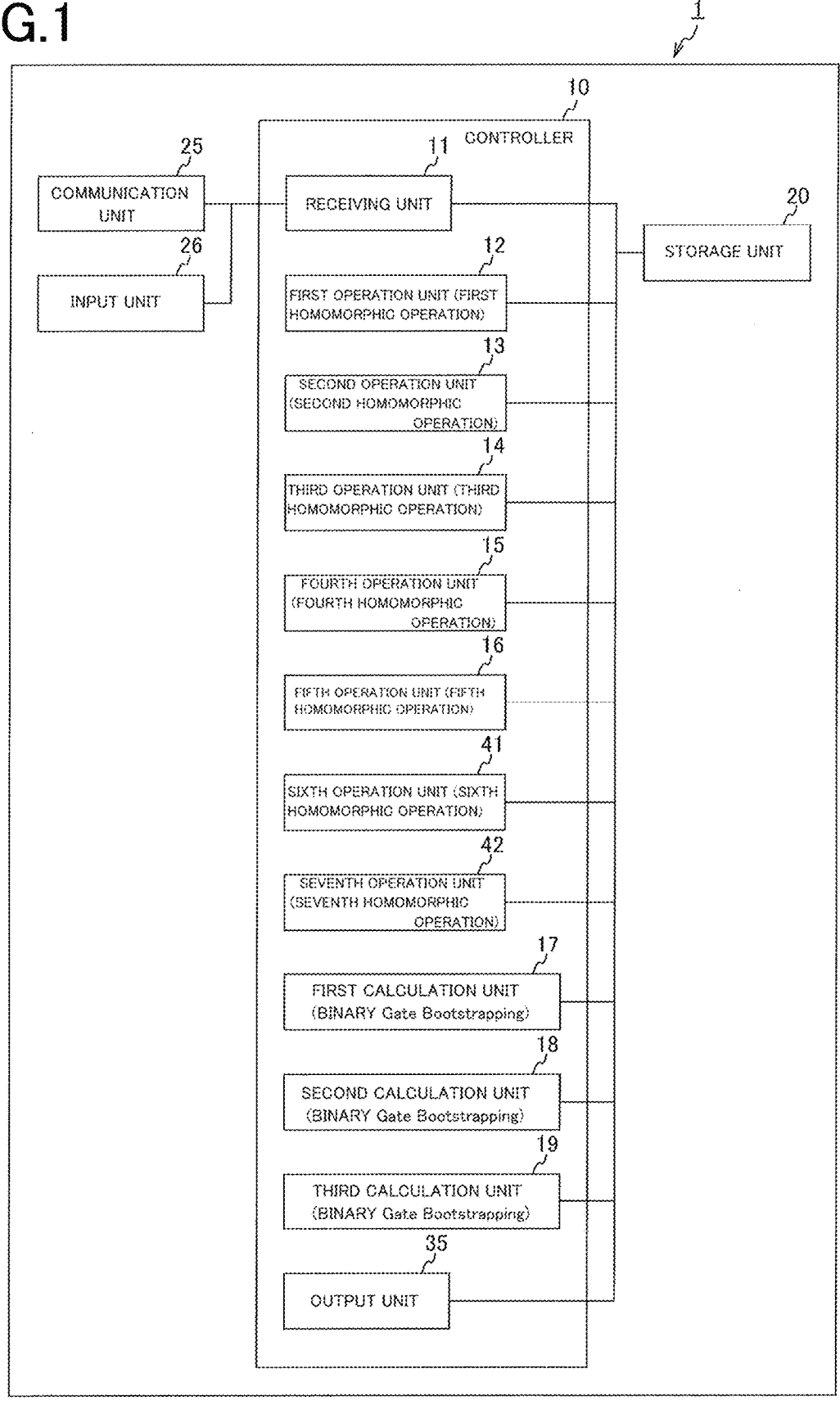
FIG. 1 is an explanatory diagram of a functional configuration of an encryption processing apparatus according to a first example of the present embodiment.

FIG. 1 is an explanatory diagram of a functional configuration of an encryption processing apparatus according to a first example of the present embodiment.

An encryption processing apparatus 1 includes a controller 10, a storage unit 20, a communication unit 25, and an input unit 26.

The controller 10 includes a receiving unit 11, a first operation unit 12, a second operation unit 13, a third operation unit 14, a fourth operation unit 15, a fifth operation unit 16, a first Bootstrapping unit (calculation unit) 17, a second Bootstrapping unit (calculation unit) 18, a third Bootstrapping unit (calculation unit) 19, and an output unit 35. The controller 10 further includes a sixth operation unit 41 and a seventh operation unit 42 each dividing coefficients in a ciphertext by 2.

The encryption processing apparatus 1 performs multiplication between Integer-wise type positive TLWE ciphertexts by using a half plane (right half plane) of a circle group constituting a ciphertext.

The receiving unit 11 receives input of a ciphertext that is an object of an operation, via the communication unit 25 or the input unit 26. Alternatively, the receiving unit 11 receives input of a ciphertext from other processes performed by the encryption processing apparatus 1.

The sixth operation unit 41 performs an operation that divides coefficients in a ciphertext input thereto or the ciphertext output from the first operation unit 12 by 2.

The seventh operation unit 42 performs an operation that divides coefficients in a ciphertext input thereto or the ciphertext output from the second operation unit 13 by 2.

The first operation unit 12 performs a first homomorphic operation for a ciphertext input thereto or the ciphertext output from the sixth operation unit 41.

The second operation unit 13 performs a second homomorphic operation for a ciphertext input thereto or the ciphertext output from the seventh operation unit 42.

The first Bootstrapping unit 17 performs first Bootstrapping for the ciphertext output from the first operation unit 12.

The third operation unit 14 performs a third homomorphic operation for the ciphertext output from the first operation unit 12 and the ciphertext output from the first Bootstrapping unit 17.

The fourth operation unit 15 performs a fourth homomorphic operation for the ciphertext output from the second operation unit 13 and the ciphertext output from the first Bootstrapping unit 17.

The first Bootstrapping unit 17 may perform the first Bootstrapping for the ciphertext output from the second operation unit 13.

Also in this case, the third operation unit 14 performs the third homomorphic operation for the ciphertext output from the first operation unit 12 and the ciphertext output from the first Bootstrapping unit 17. The fourth operation unit 15 performs the fourth homomorphic operation for the ciphertext output from the second operation unit 13 and the ciphertext output from the first Bootstrapping unit 17.

The second Bootstrapping unit 18 performs second Bootstrapping for the ciphertext output from the third operation unit 14.

The third Bootstrapping unit 19 performs third Bootstrapping for the ciphertext output from the fourth operation unit 15.

The fifth operation unit 16 performs a fifth homomorphic operation for the ciphertext output from the second Bootstrapping unit 18 and the ciphertext output from the third Bootstrapping unit 19.

The first operation unit 12, the second operation unit 13, the third operation unit 14, the fourth operation unit 15, the fifth operation unit 16, the sixth operation unit 41, and the seventh operation unit 42 are arithmetic processing units that implement homomorphic operations described below by software.

The first Bootstrapping unit 17, the second Bootstrapping unit 18, and the third Bootstrapping unit 19 are arithmetic processing units that implement Gate Bootstrapping processes described below by software.

At least one of the first operation unit 12, the second operation unit 13, the third operation unit 14, the fourth operation unit 15, the fifth operation unit 16, the sixth operation unit 41, the seventh operation unit 42, the first Bootstrapping unit 17, the secon.

Bootstrapping unit 18, the third Bootstrapping unit 19, and the output unit 35 may be implemented by hardware.

The output unit 35 outputs a final operation result to outside of the encryption processing apparatus 1 or to another processing process performed in the encryption processing apparatus 1.

The storage unit 20 can store therein an input ciphertext, a temporary file and temporary data used in an operation for ciphertexts, and an output ciphertext.

The storage unit 20 can also store therein an encrypted encryption database 60.

Further, the storage unit 20 stores therein a LUT (lookup table) in which calculated values of coefficients in a test vector polynomial described below are stored.

The communication unit 25 connects the encryption processing apparatus 1 to a network, thereby enabling communication with an external device.

The encryption processing apparatus 1 can serve as a database server by storing the encrypted encryption database 60 in the storage unit 20 and including the communication unit 25.

In this case, the encryption processing apparatus 1 can receive an encrypted query from a terminal device as the external device, search the encrypted encryption database 60, and send an encrypted search result to the terminal device.

The input unit 26 inputs a ciphertext that is an object of arithmetic processing and a query for the encryption database 60, to the encryption processing apparatus 1.

Figure 2A:
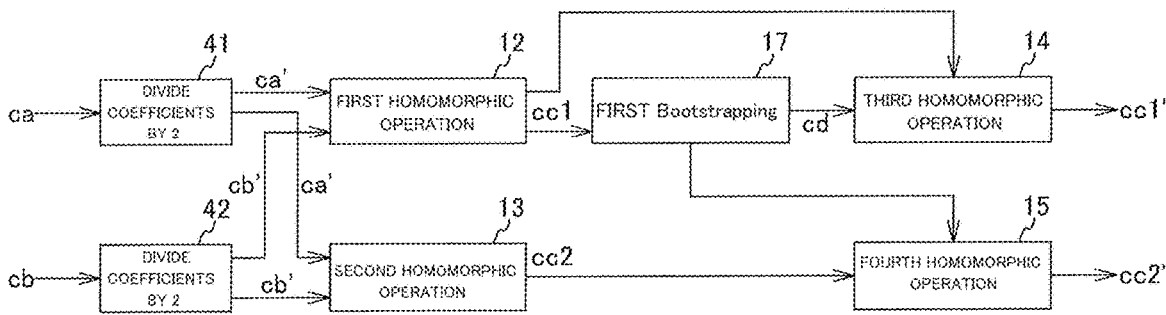
FIGS. 2A to 2C are detailed explanatory diagrams of operation processes based on the functional configuration in FIG. 1.
Figure 2B:
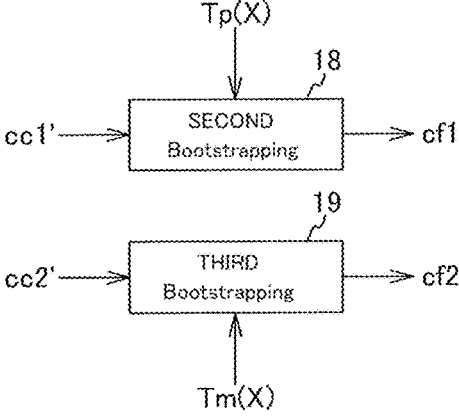
Figure 2C:
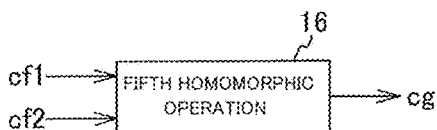

FIGS. 2A to 2C are detailed explanatory diagrams of operation processes based on the functional configuration in FIG. 1.

The configuration illustrated in FIGS. 2A to 2C uses Gate Bootstrapping presented in the aforementioned paper. Gate Bootstrapping on TFHE presented in the aforementioned paper will be described in detail below.

The encryption processing apparatus 1 performs multiplication between Integer-wise type TLWE ciphertexts (a TLWE ciphertext ca and a TLWE ciphertext cb), as described above. The TLWE ciphertext ca is a ciphertext of a plaintext integer a, and the TLWE ciphertext cb is a ciphertext of a plaintext integer b. Each of the TLWE ciphertexts ca and cb is a ciphertext that uses the right half plane of a circle group as a range of plaintext and has, for example, a positive integer as a plaintext.

The encryption processing apparatus 1 performs multiplication between ciphertexts by using the method called Quarter Square described below.

FIG. 2A illustrates processes of obtaining ciphertexts respectively corresponding to the sum (a+b) of the plaintext a and the plaintext b and the difference (a−b).

In FIG. 2A, the encryption processing apparatus 1 inputs the TLWE ciphertext ca to the sixth operation unit 41 to obtain a new TLWE ciphertext ca' that is obtained by dividing coefficients in the TLWE ciphertext ca by 2.

The encryption processing apparatus 1 also inputs the TLWE ciphertext cb to the seventh operation unit 42 to obtain a new TLWE ciphertext cb' that is obtained by dividing coefficients in the TLWE ciphertext cb by 2.

The encryption processing apparatus 1 inputs the TLWE ciphertext ca' and the TLWE ciphertext cb' to the first operation unit 12 and performs homomorphic addition (ca'+cb') (the first homomorphic operation) between the TLWE ciphertext ca' and the TLWE ciphertext cb', thereby obtaining a new TLWE ciphertext cc1.

The encryption processing apparatus 1 also inputs the TLWE ciphertext ca' and the TLWE ciphertext cb' to the second operation unit 13 and performs homomorphic subtraction (ca'−cb') that subtracts the TLWE ciphertext cb' from the TLWE ciphertext ca' (the second homomorphic operation), thereby obtaining a new TLWE ciphertext cc2.

The encryption processing apparatus 1 inputs the TLWE ciphertext cc1 or the TLWE ciphertext cc2 to the first Bootstrapping unit 17 and performs Gate Bootstrapping for the TLWE ciphertext cc1 or the TLWE ciphertext cc2 by using a flat test vector polynomial T1(X) in which all coefficients are ¼, thereby obtaining a new TLWE ciphertext cd.

The encryption processing apparatus 1 inputs the TLWE ciphertext cc1 and the TLWE ciphertext cd to the third operation unit 14 and performs homomorphic addition (cc1+cd) between the TLWE ciphertext cc1 and the TLWE ciphertext cd (the third homomorphic operation), thereby obtaining a new TLWE ciphertext cc1'.

The encryption processing apparatus 1 inputs the TLWE ciphertext cc2 and the TLWE ciphertext cd to the fourth operation unit 15 and performs homomorphic addition (cc2+cd) between the TLWE ciphertext cc2 and the TLWE ciphertext cd (the fourth homomorphic operation), thereby obtaining a new TLWE ciphertext cc2'.

FIG. 2B illustrates processes of obtaining a ciphertext corresponding to the result of division of the square of the sum (a+b) of the plaintext a and the plaintext b by 4 and a ciphertext corresponding to the result of division of the square of the difference (a−b) by 4.

In FIG. 2B, the encryption processing apparatus 1 inputs the TLWE ciphertext cc1' to the second Bootstrapping unit 18 and performs Functional Bootstrapping (the second Bootstrapping), described later, using a test vector polynomial $T_p(X)$, thereby obtaining a new ciphertext cf1.

The encryption processing apparatus 1 also inputs the TLWE ciphertext cc2' to the third Bootstrapping unit 19 and performs Functional Bootstrapping (the thir.

Bootstrapping) using a test vector polynomial $T_m(X)$, thereby obtaining a new ciphertext cf2.

FIG. 2C illustrates a process of obtaining a multiplication result obtained by subtracting the result of division of the square of the difference (a−b) of the plaintext a and the plaintext b by 4 from the result of division of the square of the sum (a+b) by 4.

In FIG. 2C, the encryption processing apparatus 1 inputs the TLWE ciphertext cf1 and the TLWE ciphertext cf2 to the fifth operation unit 16 and performs homomorphic subtraction that subtracts the TLWE ciphertext cf2 from the TLWE ciphertext cf1 in a homomorphic manner (the fifth homomorphic operation), thereby obtaining a new TLWE ciphertext cg. Gate Bootstrapping explained in TFHE is described in detail.

Gate Bootstrapping is a method for making fully homomorphic encryption, which has not been practical because of a huge amount of data and its operation time, practical.

TFHE in the "aforementioned paper" uses encryption in which LWE (Learning with Errors) encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 3:
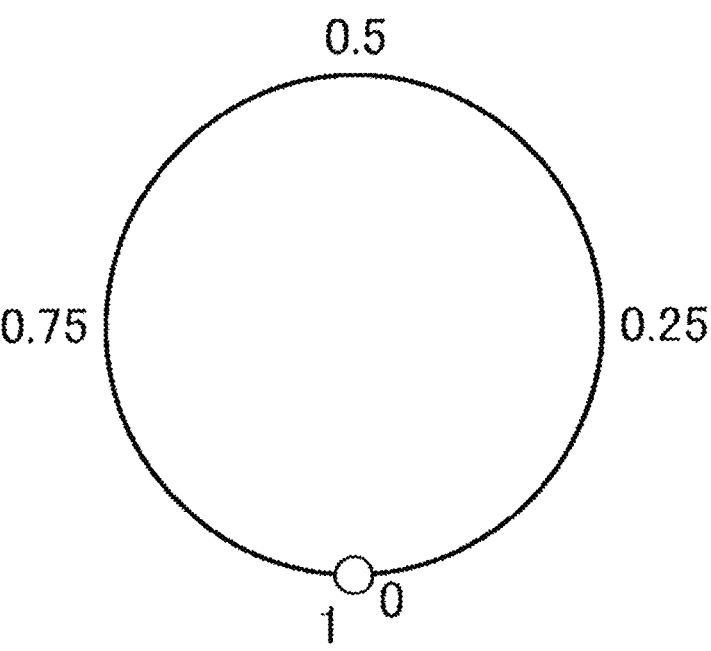
FIG. 3 is an image diagram for explaining a circle group that TLWE encryption has as a plaintext.

FIG. 3 is an image diagram for explaining a circle group that TLWE encryption has as a plaintext.

TLWE encryption has a real number that moves forward from 0 with a real number precision and, when reaching 1, returns to 0. TLWE encryption regards any point on a circle group {T} illustrated in FIG. 5 as a plaintext, and uses a range near 0 (including an error) and a range near (including an error) as a plaintext.

The point on the circle group {T} is also described as an "element" in the present specification.

An encryption processing apparatus handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group {T}. In addition, a private key [s] obtained by collecting N values that can be 0 or 1 is prepared.

Assuming that a random number in the Gaussian distribution (the normal distribution) in which an average value is a plaintext and a variance is preset to $\alpha$ is e, an example of a TLWE ciphertext is a pair ([a], [s]·[a]+e).

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s(([a], b)=b-[s]·[a]=e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $$\varphi_s(([a] + [a'], b + b')) = (b + b') - [s]·([a] + [a']) =$$
$$(b - [s]·[a]) + (b' - [s]·[a']) = \varphi_s([a], b) + \varphi_s([a'], b').$$

It is thus found that a TLWE ciphertext is a ciphertext obtained by "additive homomorphic encryption".

In TFHE in the "aforementioned paper", various operations are achieved by repeating "performing an additive operation for TLWE ciphertexts each obtained by adding an error to a plaintext and reducing an error by Gate Bootstrapping".

In the following descriptions, a trivial ciphertext such as ([0], $\mu$) is a TLWE ciphertext that can be decrypted with any private key, that is, a ciphertext that can be decrypted with any private key to provide the same plaintext.

In ([0], $\mu$), [0] represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext ([0], $\mu$), the private key [s] is multiplied by the zero vector [0] to disappear as represented by $\varphi_s(([0], \mu))=\mu-[s]·0=$. The plaintext $\mu$ is thus obtained easily. Such a ciphertext is a trivial ciphertext with regard to the plaintext $\mu$.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th degree polynomial is generally represented by $a_n x^n + a_{n-1} x^{n-1} + \ldots + a_0$.

These all sets form a commutative group for a sum of polynomials f(x)+g(x).

Further, a product of polynomials f(x)g(x) has properties identical to those of the commutative group except that an inverse element is not necessarily present. Such a structure is called "monoid".

Regarding the sum and the product of polynomials, the distributive property is established as follows.

$$f(x)\{g(x) + g'(x)\} = f(x)g(x) + f(x)g'(x)$$

Therefore, when the sum and the product of polynomials are defined using polynomials as elements, a "ring" is formed, which is called "polynomial ring".

TFHE uses a polynomial ring including the circle group {T} as coefficients, and such a polynomial ring is represented as T[X].

When a polynomial T(X), which is a polynomial ring, is decomposed into T[X] $(X^n+1)+T[X]$, and only remainders are extracted and collected, a factor ring of a polynomial ring is obtained because the remainders also form a "ring".

In TFHE, a factor ring of a polynomial ring is represented as $T[X]/(X^n+1)$.

A polynomial $F(X)=\mu X^{n-1}+\mu X^{n-2}+\ldots+\mu X+\mu$ is extracted by using a desired coefficient (belongs to T) as an element of the factor ring of the polynomial ring $T[X]/(X^n+1)$.

When the element F(X) of the factor ring of the polynomial ring is multiplied by X, $\mu X^{n-1}+\mu X^{n-2}+ \ldots +\mu X-\mu$ is obtained, the coefficient of the top term appears as a constant term with a sign reversed from positive to negative.

When multiplication by X is further performed, the same phenomenon happens again as represented by $\mu X^{n-1}+ \mu X^{n-2}+ \ldots +\mu X^2-\mu X-\mu$ (the coefficient of the top term appears as a constant term with a sign reversed from positive to negative).

When this multiplication is repeated n times, $-\mu X^{n-1}- \mu X^{n-2} \ldots -\mu X-\mu$ is obtained, so that the coefficients of all terms become negative.

When multiplication by X is further continued, the coefficient of the top term becomes positive from negative and appears as a constant term as represented by $$-\mu X^{n-1} - \mu X^{n-2} \ldots - \mu X + \mu,$$

$$-\mu X^{n-1} - \mu X^{n-2} \ldots + \mu X + \mu.$$

When multiplication by X is repeated $2n$ times in total, the multiplication result returns to the original element of the factor ring of the polynomial ring $F(X)=\mu X^{n-1}+ \mu X^{n-2}+ \ldots +\mu X+\mu$. As described above, the highest-order coefficient ($\mu$) appears as the lowest-order constant term with a reversed sign ($-\mu$), and terms are shifted by one in whole.

That is, the polynomial $F(X)=\mu X^{n-1}+\mu X^{n-2}+ \ldots +X+\mu$ is a finite cyclic group of order 2n in a ring that is the factor ring of the polynomial ring $T[X]/(X^n+1)$.

In TFHE, an encryption processing apparatus achieves fully homomorphic encryption by using such properties of the polynomial F(X) based on a factor ring of a polynomial ring.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of a polynomial ring $T[X]/(X^n+1)$ described above.

In order to obtain TRLWE encryption, elements of the factor ring of a polynomial ring $T[X]/(X^n+1)$ are selected at random.

In fact, n coefficients in an (n−1)th degree polynomial are selected as uniformly distributed random numbers from the circle group {T}.

When the degree of the polynomial is n−1, the polynomial is not divided by $X^n+1$, and it is not necessary to consider a remainder. Therefore, it is assumed that the (n−1)th degree polynomial is a polynomial a(X).

A polynomial s(X) used as a private key is structured as follows, by collecting n values each of which can be 0 or 1 at random.

$$s(X) = s_{n-1}X^{n-1} + s_{n-2}X^{n-2} + \ldots s_1 X + s_0$$

Assuming that n random numbers $e_i$ are random numbers in the Gaussian distribution (the normal distribution) in which an average value is a plaintext $\mu_1$ and a variance is $\alpha$, the following polynomial e(X) is structured from these random numbers.

$$e(X) = e_{n-1}X^{n-1} + e_{n-2}X^{n-2} + \ldots e_1 X + e_0$$

Decomposition of $s(X) \cdot a(X)+e(X)$ is performed into f(X) $(X^n+1)+b(X)$, and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) is determined in such a manner that $\varphi_s$ becomes an element of $T[X]/(X^n+1)$ serves as a decryption function, where $\varphi_s((a(X), b(X))=b(X)-s(X)\cdot a(X)+g(X)(X^n+1)$, as in TLWE encryption.

[Gadget Decomposition]

Gadget Decomposition is described.

Figure 5:
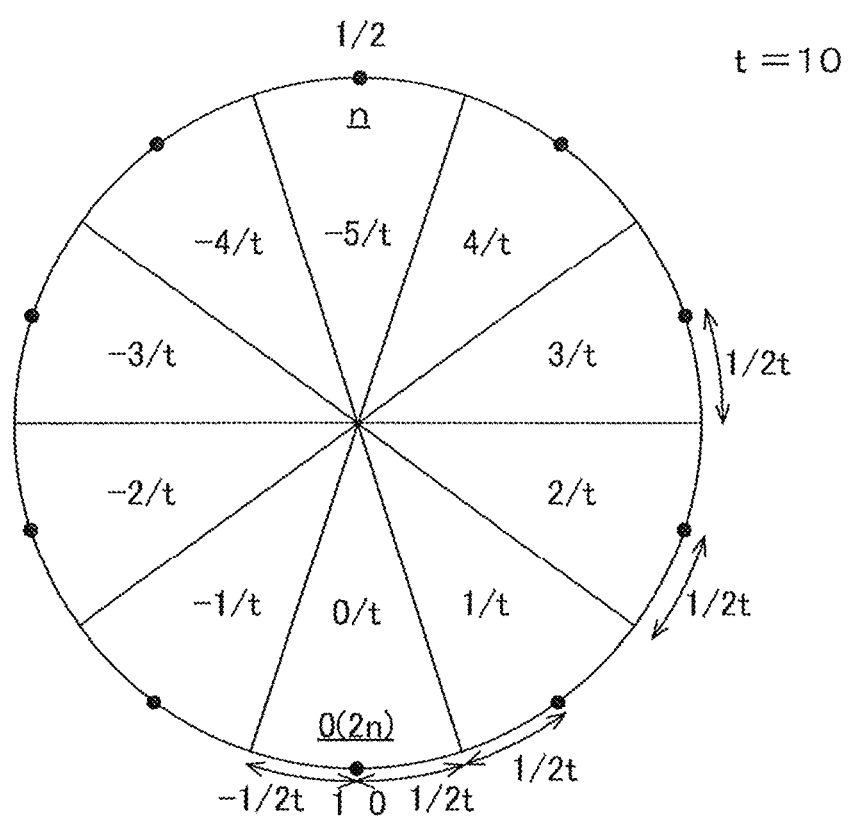
FIG. 5 is an explanatory diagram of TFHE applied to an Integer-wise type.

A coefficient in a polynomial used in a TRLWE ciphertext is a real number that is an element of the circle group {T} in FIG. 5 and is equal to or larger than 0 and less than 1, and only has a fractional part.

An operation of decomposing this coefficient into several bits in binary notation is defined as Gadget Decomposition (Dec) in TFHE in the "aforementioned paper".

For example, assuming that the degree n of the polynomial F(X) of a TRLWE ciphertext is 2, one unit of decomposition is $Bg=2^2$, and decomposition into 1=3 elements is performed. At this time, each element is arranged to enter between $-Bg/2$ and $Bg/2$.

A TRLWE ciphertext is a combination of two polynomials like (a(X), b(X)) as described above. Therefore, a TRLWE ciphertext d can be written as $$d=[0.75X^2+0.125X+0.5, 0.25X^2+0.5X+0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since $0.75=-0.25$ is established on the circle group {T}, decomposition can be performed as follows.

$$d = \left[0.75X^2 + 0.125X + 0.5, 0.25X^2 + 0.5X + 0.375\right] =$$
$$\left[-0.25X^2 + 0.125X + 0.5, 0.25X^2 + 0.5X + 0.25 +\right.$$
$$0.125\right] = \left[0.25 \times \left(-X^2 + 2\right) + 0.25^2 \times 2X + 0.25^3 \times 0, 0.25 \times\right.$$
$$\left.\left(X^2 + 2X + 1\right)9 + 0.25X^2 \times 2 + 0.25^3 \times 0\right]$$

Therefore, when Gadget Decomposition is performed, a vector $$Dec(d) = \left[-X^2 + 2, 2X, 0, X^2 + 2X + 1, 2, 0\right]$$

is obtained.

An operator H of inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of inverse transform. A TRLWE ciphertext d' is obtained by performing an operation $Dec(d) \cdot H$. The lower bits are rounded off.

It can also be said that an operation of obtaining [v] that makes $\|d-[v] \cdot H\|$ minimum with respect to the TRLWE ciphertext d is Gadget Decomposition. Here, | is a vector norm (length).

Ciphertexts $Z_i=(a(X), b(X))$ formed by polynomials in which all coefficients of $e(X)$ have an average value of 0 and a variance is a are created. The number of the created ciphertexts is 2l.

The plaintext μ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key [s] (Nth degree) used for TLWE ciphertexts, each element of a private key [s'] for encrypting the private key [s] is selected to be either of two values, i.e., 0 or 1 for use in Gate Bootstrapping.

It is necessary to make the degree of the private key [s'] the same as the degree n of polynomials used in TRLWE encryption.

The TRGSW ciphertext BK is created for each element of the private key [s].

When decryption with the private key [s'] is performed, 2l TRLWE ciphertexts $Z_j$ are created where $\varphi_{s'}(Z_j)=0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts having this configuration are prepared, where N is the same as the degree of the private key [s]. A set of the thus prepared TRGSW ciphertexts is referred to as "Bootstrapping Key".

A cross product of the TRGSW ciphertext $BK_i$ and the TRLWE ciphertext d is defined as follows.

$$BKi \times d = Dec(d) \cdot BKi$$

Gadget Decomposition is an operation of obtaining [v] that makes $\|d-[v] \cdot H\|$ minimum with respect to the TRLWE ciphertext d.

Therefore, by using [v]=Dec(d) and an error ($\varepsilon_a(X)$, $\varepsilon_b(X)$), [v]·H=d+($\varepsilon_a(X)$, $\varepsilon_b(X)$) can be written.

As a result, $BKi \times d=Dec(d) \cdot BKi$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates a dot product, and [v]·H=d+ ($\varepsilon_a(X)$, $\varepsilon_b(X)$) is substituted into the right side, $$= \sum_{j=1}^{2\ell} v_j \times Z_j + s_i \times (d + (\epsilon_a(X), \epsilon_b(X)))$$

$$= \sum_{j=1}^{2\ell} v_j \times Z_j + s_i \times d + s_i \times (\epsilon_a(X), \epsilon_b(X))$$

is obtained, and becomes the same as calculation of a sum of the following three ciphertexts c1, c2, and c3.

$$c_1 = \sum_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_{s}\cdot(c_1)$ is 0.

In addition, $\varphi_{s}\cdot(c_3)$ obtained by decryption is set to be sufficiently small also in the subsequent operations, because the magnitude of the absolute value of a plaintext can be limited by a system parameter.

In this case, $\varphi_{s}\cdot(BKi \times d)=\varphi_{s}\cdot(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1-d_0$ is substituted for d, and $d_0$ is finally added, the following CMux function is completed.

$$CMux(BK_i, d_0, d_1) = BKi \times (d_1 - d_0) + d_0 = Dec(d_1 - d_0) \cdot BK_i + d_0$$

The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

Figure 4:
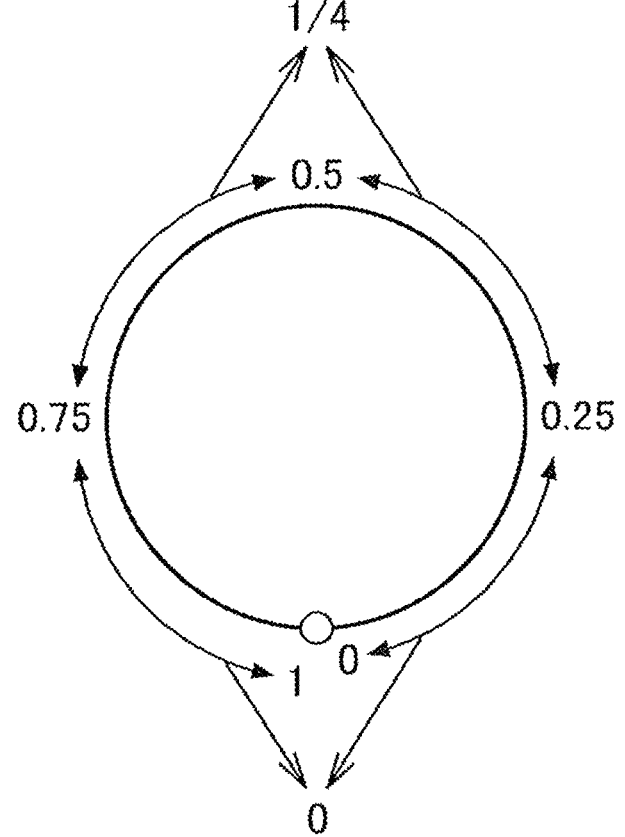
FIG. 4 is an operation image diagram of binary Gate Bootstrapping.

FIG. 4 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 ($\frac{1}{4}$) or 0.75 ($\frac{3}{4}$) to 1 on the circle group {T} in FIG. 3 is converted to a TLWE ciphertext 0, and a plaintext in a section from 0.25 ($\frac{1}{4}$) to 0.75 ($\frac{3}{4}$) is converted to a ciphertext 0.25 ($\frac{1}{4}$).

An error added to the plaintext in this conversion is any error in a range of $\pm\frac{1}{16}$.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$$T(X) = F(X) \cdot X^{n/2}$$

is prepared, which is obtained by multiplying the following polynomial F(X)

$$F(X) = \mu X^{n-1} + \mu X^{n-2} + \dots \mu X + \mu$$

where $\mu = \frac{1}{8}$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1'=\varphi_s(c')\approx 2n\times\varphi_s(c)=2n\mu 1$ is obtained. As n becomes larger, an error becomes smaller relatively.

A trivial TRLWE ciphertext (0, T(X)) whose plaintext is the polynomial T(X) is prepared, and it is assumed that $A_0=X^{-b'}\times(0, T(X))=(0, X^{-b'}\times T(X))$, where 0 indicates a 0th degree polynomial 0. Since b' is an integer, a power of X can be defined naturally.

Subsequently, $A_i=CMux(BK_i, A_{i-1}, X^{a'i}A_{i-1})$ is calculated in turn by using $BK_i$ that is the above-described Bootstrapping Key. Since a'i is an integer also in this expression, a power of X can be defined naturally.

Accordingly, the plaintext is not changed as it is when $s_i$ is 0, and multiplication by $X^{a'i}$ is performed in turn when $s_i$ is 1.

Therefore, when calculation is repeated as represented by $$\phi_{s'}(A_0) = X^{-b'} T(X)$$

-continued
$$\phi_{s'}(A_1) = X^{s_1 a'_1 - b'} T(X)$$

$$\phi_{s'}(A_2) = X^{s_2 a'_2 + s_1 a'_1 - b'} T(X),$$

then $$\phi_{s'}(A_n) = X^{\sum_{i=1}^{N} s_i \times a'_i - b'} T(X)$$

is obtained.
Here, $$\sum_{i=1}^{N} s_i \times a'_i - b'$$

is equal to the decryption function $\varphi s(c')$ with a sign reversed. Therefore, $$\phi_{s'}(A_n) = X^{-\phi_s(c')} T(X)$$

is obtained. Here, $\varphi x'(A_n)$ is a ciphertext of a polynomial obtained by multiplying $\mu 1'$ times the polynomial T(X) by $X^{-1}$.

In association with the plaintext $\mu 1$ of the TLWE ciphertext c related to BlindRotate, unique values (up to 2n values including n coefficients and n values obtained by reversing the signs of the coefficients) in accordance with the number of times $\mu 1'$ (=2n$\mu 1$) of multiplying the polynomial T(X) by X is obtained, and therefore this can be regarded as a kind of Look Up Table.

(2) SampleExtract

In the plaintext polynomial $\varphi_s \cdot (A_n)$ obtained by decrypting the TRLWE ciphertext $A_n$ obtained by BlindRotate in (1), n/2$-\varphi_s(c')$ terms from the lowest term have a coefficient of $-\mu$. When $\varphi_s \cdot (A_n)$ is negative, coefficients are $-\mu$ from the highest term in turn conversely.

When attention is paid only to a constant term of the plaintext polynomial $\varphi_s \cdot (A_n)$ obtained by decrypting the TRLWE ciphertext $A_n$, the constant term is $\mu$ if $\varphi_s \cdot (c')$ is equal to or greater than n/2 and less than 3n/2, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s \cdot (A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext es is described.

All TRLWE ciphertexts can be expressed as (A(X), B(X)) by putting polynomials $$A(X) = \sum_{i=1}^{n} a_i X^{i-1}$$

$$B(X) = \sum_{i=1}^{n} b_i X^{i-1},$$

where n is the degree.
When decryption with the private key [s'] is performed, the expression can be expanded by putting a polynomial of the private key as $$S'(X) = \sum_{j=1}^{n} s'_j X^{j-1}.$$

-continued

Then, $$\phi_{s'}(c) = B(X) - S'(X) \cdot A(X) = \sum_{i=1}^{n} b_i X^{i-1} - \sum_{i=1}^{n} \sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)} =$$

$$\sum_{i=1}^{n} b_i X^{i-1} - \sum_{i=1}^{n} \sum_{j=i-1}^{n+i-2} a_i s'_{j-i+2} X^j =$$

$$\sum_{i=1}^{n} b_i X^{i-1} - \sum_{i=1}^{n} \sum_{j=i-1}^{n-1} a_i s'_{j-i+2} X^j - \sum_{i=1}^{n} \sum_{j=n}^{n+i-2} a_i s'_{j-i+2} X^j =$$

$$\sum_{j=1}^{n} b_j X^{j-1} - \sum_{j=0}^{n-1} \sum_{i=1}^{j+1} a_i s'_{j-i+2} X^j - \sum_{j=n}^{2n-2} \sum_{i=j-n+2}^{n} a_i s'_{j-i+2} X^j =$$

$$\sum_{j=0}^{n-1} b_{j+1} X^j - \sum_{j=0}^{n-1} \sum_{i=0}^{j} a_{i+1} s'_{j-i+1} X^j -$$

$$\sum_{j=0}^{n-2} \sum_{i=j-n+1}^{-1} a_{i+n+1} s'_{j-i+1} X^{j+n} =$$

$$\sum_{j=0}^{n-2} b_{j+1} X^j + b_n X^{n-1} - \sum_{j=0}^{n-2} \sum_{i=0}^{j} a_{i+1} s'_{j-i+1} X^j -$$

$$\sum_{i=0}^{n-1} a_{i+1} s'_{n-i} X^{n-1} - \sum_{j=0}^{n-2} \sum_{i=j-n+1}^{-1} a_{i+n+1} s'_{j-i+1} X^{j+n} =$$

$$\sum_{j=0}^{n-2} \left( b_{j+1} X^j - \sum_{i=0}^{j} a_{i+1} s'_{j-i+1} X^j - \sum_{i=j-n+1}^{-1} a_{i+n+1} s'_{j-i+1} X^{j+n} \right) +$$

$$b_N X^{n-1} - \sum_{i=0}^{n-1} a_{i+1} s'_{n-i} X^{n-1}$$

Since this is "factor ring of polynomial ring", a remainder when this is divided by $(X^n+1)$ is calculated. Then, $$\sum_{j=0}^{n-2} \left( b_{j+1} X^j - \sum_{i=0}^{j} a_{i+1} s'_{j-i+1} X^j + \sum_{i=j-n+1}^{-1} a_{i+n+1} s'_{j-i+1} X^j \right) +$$

$$b_N X^{n-1} - \sum_{i=0}^{n-1} a_{i+1} s'_{n-i} X^{n-1} =$$

$$\sum_{j=0}^{n-2} \left( b_{j+1} - \sum_{i=0}^{j} a_{i+1} s'_{j-i+1} + \sum_{i=j-n+1}^{-1} a_{i+n+1} s'_{j-i+1} \right) X^j +$$

$$\left( b_n - \sum_{i=0}^{n-1} a_{i+1} s'_{n-i} \right) X^{n-1} \text{ is obtained.}$$

Further, when $$a'_i = \begin{cases} a_i & (i \geq 1) \\ -a_{i+n} & (\text{otherwise}) \end{cases}$$

is put, then $$= \sum_{j=0}^{n-2} \left( b_{j+1} - \sum_{i=0}^{j} a'_{i+1} s'_{j-i+1} - \sum_{i=j-n+1}^{-1} a'_{i+1} s'_{j-i+1} \right) X^j +$$

$$\left( b_N - \sum_{i=0}^{n-1} a'_{i+1} s'_{n-i} \right) X^{n-1} =$$

$$\sum_{j=0}^{n-2} \left( b_{j+1} - \sum_{i=j-n+1}^{j} a'_{i+1} s'_{j-i+1} \right) X^j + \left( b_N - \sum_{i=0}^{n-1} a_{i+1} s'_{n-i} \right) X^{n-1} =$$

$$\sum_{j=0}^{n-2} \left( b_{j+1} - \sum_{i=0}^{n-1} a'_{i+j-n+2} s'_{n-i} \right) X^j + \left( b_n - \sum_{i=0}^{n-1} a_{i+1} s'_{n-i} \right) X^{n-1} =$$

$$\sum_{j=0}^{n-1} \left( b_{j+1} - \sum_{i=0}^{n-1} a'_{i+j-n+2} s'_{n-i} \right) X^j$$

is obtained, and coefficients of respective terms in a plaintext polynomial are obtained from $$\phi_{s'}(c) = \sum_{j=0}^{n-1} \left( b_{j+1} - \sum_{i=0}^{n-1} a'_{i+j-n+2} s'_{n-i} \right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = a'_{-i+2}$$

is put, the extracted coefficient can be transformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a''} = \varphi_{s'}\left( \vec{a''}, b_1 \right).$$

That is, when coefficients are extracted from the TRLWE ciphertext $A_n=(A(X), B(X))$ obtained by BlindRotate in (1) while the coefficients are set as $$a''_i = \begin{cases} a_1 & (i = 1) \\ -a_{-i+n+2} & (\text{otherwise}) \end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext is the output of SampleExtract and has either of two types, i.e., $-\mu$ or $\mu$ as a plaintext.

A TLWE ciphertext cs=([a"], $b_1$)+([0], $\mu$) obtained by adding a trivial ciphertext ([0], $\mu$) of which plaintext is to the thus obtained TLWE ciphertext is obtained.

Specifically, since is ⅛ in the polynomial F(X) as a test vector, a ciphertext of −⅛ or ⅛ is obtained in this stage.

When a trivial TLWE ciphertext ([0], ⅛) of which plaintext is $\mu=⅛$ is added to the output result of SampleExtract, $$-1/8 + 1/8 = 0$$

$$1/8 + 1/8 = 1/4$$

are established, and thus a new TLWE ciphertext cs having either of two values, i.e., 0 or ¼ as a plaintext is obtained.

(3) KeySwitching

The TLWE ciphertext cs obtained by using SampleExtract in (2) is encrypted with the private key [s'], not with the private key [s].

Therefore, it is necessary to replace the key of the TLWE ciphertext es with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s_i' \times 2^{-1} s_i' \times 2^{-2} s_i' \times 2^{-3} \dots \,.$$

The private key is [s]. A "number of digits" t is a system parameter.

When decryption is performed with the private key [s], $$\phi_s(KS_{i,j}) = s_i' \times 2^{-j}$$

is obtained. This is a "KeySwitching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers one by one, the elements can be written in the following form.

$$a_i \approx \sum\nolimits_{j=1}^{t} a_{i,j} \times 2^{-j}$$

Although an error is increased in this stage, the maximum value of the absolute value can be limited by a system parameter.

As main processing of KeySwitching, the following TLWE ciphertext cx is calculated.

$$cx = (\vec{0}, b) - \sum\nolimits_{i=1}^{n} \sum\nolimits_{j=1}^{t} a_{i,j} \times KS_{i,j}$$

Since the term ([0], b) is a trivial ciphertext, this term is b when being decrypted. A result of decryption of the TLWE ciphertext cx is calculated as follows.

$$\phi_s(cx) = b - \sum\nolimits_{i=1}^{n} \sum\nolimits_{j=1}^{t} a_{i,j} \times s_i' \times 2^{-j} = b - \sum\nolimits_{i=1}^{n} \sum\nolimits_{j=1}^{t} s_i' \times a_{i,j} \times 2^{-j}$$

Since s'$_i$ is a constant for j, it is factored out as follows.

$$= b - \sum\nolimits_{i=1}^{n} s_i' \sum\nolimits_{j=1}^{t} a_{i,j} \times 2^{-j}$$

The expression obtained by decomposition into fixed-point numbers descried above is then substituted.

$$\approx b - \sum\nolimits_{i=1}^{n} s_i' \times a_i = \phi_{s'}((\vec{a}, b)) = \phi_{s'}(c_s)$$

As a result, $$\phi_s(cx) \approx \phi_{s'}(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\phi_s(cx)$ is 0 when $\phi_s(c)$ is in a range of ¼, and is ¼ when $\phi_s \cdot (c)$ is in a range of ½±¼.

By the processing described above, a TLWE ciphertext is obtained as a result of Gate Bootstrapping, which is either of two values, i.e., 0 or ¼ and has any error within ±¹⁄₁₆.

The maximum value of the error does not depend on the TLWE ciphertext c that is the input, and is a value fixed by a system parameter.

Therefore, the system parameter is set in such a manner that the maximum value of the error is any value within ±¹⁄₁₆ that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within ±¹⁄₁₆.

The processing described above is processing of Gate Bootstrapping in TFHE.

As described above, TFHE is Bit-wise type homomorphic encryption that has zero or non-zero as a plaintext and enables a logical operation to be performed. However, the plaintext is a real number from 0 to 1 associated with the circle group {T}, as described with reference to FIG. 3. Therefore, by associating sections obtained by dividing the circle group {T} with integers in turn, TFHE can be applied as Integer-wise type homomorphic encryption having an integer as a plaintext.

A TLWE ciphertext used in TFHE is described as being an additive homomorphic type for a plaintext on a circle group in the "aforementioned paper", and it is obvious that such a TLWE ciphertext enables addition (subtraction) to be performed.

Further, multiplication is made possible by the method described below. When multiplication becomes possible, TFHE can be used as homomorphic encryption that enables Integer-wise type four arithmetic operations in a more complete form, together with addition and a part of multiplication that are already known. Such TFHE enables more efficient processing as compared with bit-by-bit calculation by Bit-wise type TFHE.

FIG. 5 is an explanatory diagram of TFHE applied to the Integer-wise type.

As illustrated in FIG. 5, a range from 0 to 1 that is the range of the circle group {T} is divided into t portions. For a TLWE ciphertext, possible values of a plaintext are t values obtained by dividing the range from 0 to 1, that is, from −(t/2) to (t/2)−1, and (t/2)−1 is the maximum integer that can be recorded in one TLWE ciphertext.

As exemplified in FIG. 5, assuming that t is set to 10 and the range from 0 to 1 is divided into 10 portions, a ciphertext can represent integers of −5, −4, −3, −2, −1, 0, 1, 2, 3, and 4. These integer values are assigned to sections that are obtained by dividing the range from 0 to 1 of the circle group {T} into t=10 portions and are centered on −5/t, −4/t, −3/t, −2/t, −1/t, 0/t, 1/t, 2/t, 3/t, and 4/t, respectively. As illustrated in FIG. 5, this assignment makes it possible to successively assign integers counterclockwise from the region that is centered on ½ as a value on the circle group and is the minimum value when being represented by an integer.

As illustrated in FIG. 5, 0 (1) on the circle group {T} is within the range of the region from −1/(2t) to 1/(2t). As for a plaintext of a ciphertext on the circle group {T}, the position in the region (the position on the circle group {T}) can be adjusted by addition or subtraction of an offset based on, for example, 1/(2t) to/from the state in FIG. 5, as necessary.

In the embodiment described below, note that the meaning of the division number t of the circle group is different from that in the description related to FIG. 5, although it is essentially unchanged.

FIGS. 6A to 8B are explanatory diagrams of Integer-wise type TFHE in the present embodiment.

Figure 6A:
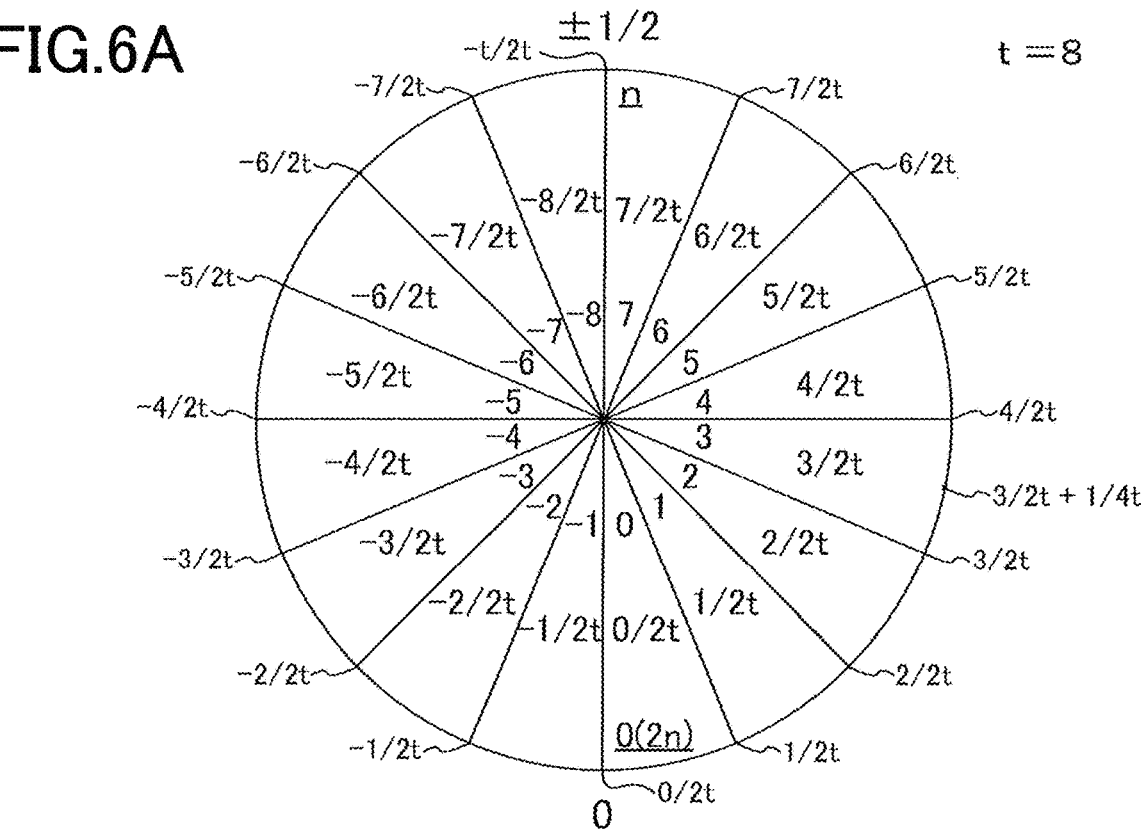
FIGS. 6A and 6B are explanatory diagrams of Integer-wise type TFHE in the present embodiment.
Figure 6B:
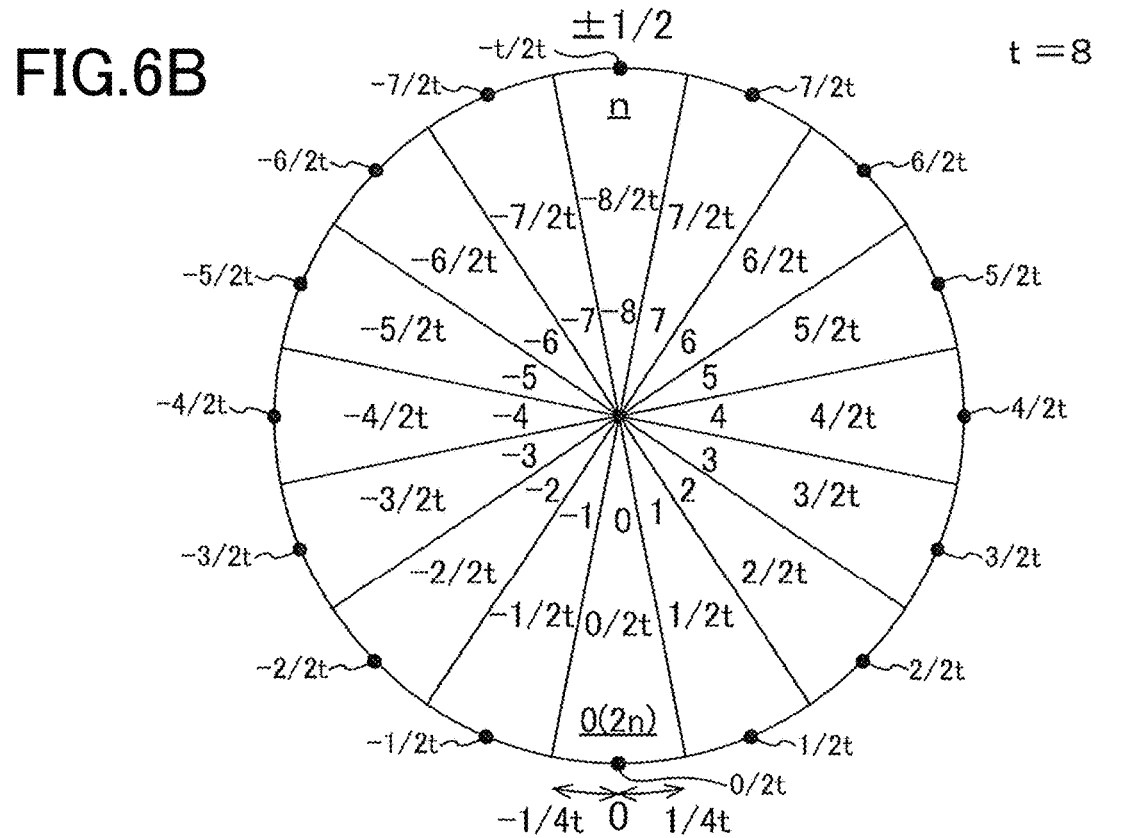

As illustrated in FIGS. 6A and 6B, ciphertexts serving as a multiplier and a multiplicand in the present embodiment each divide the entire range (0 to 1) of the circle group {T} into 2t portions.

In FIGS. 6A to 8B, the range from 0 to 1 of the circle group {T} may be described as −0.5 to 0.5.

When the value of t is made larger and the circle group {T} is more finely divided, the maximum integer value that can be recorded in a TLWE ciphertext can be made larger. However, when division is performed excessively finely, there is a problem that the range of the error to be added to the plaintext becomes excessively small, which results in decrease in the strength of the encryption. This point will be described later.

An integer value is assigned to each section with a width of 1/(2t) obtained by dividing the circle group {T}, and a range of possible values of a plaintext integer of a TLWE ciphertext is from −t to t−1, where t−1 is the maximum integer value that can be recorded in one TLWE ciphertext, and −t is the minimum integer value that can be recorded in one TLWE ciphertext.

As in the case of FIG. 5, a state where no offset is added to a plaintext (the offset added to the plaintext is 0) is illustrated in FIG. 6B. FIG. 6A illustrates a state where an offset of, for example, +1/(4t) is added to the plaintext of the ciphertext illustrated in FIG. 6B. By adding the offset, the manner of slicing the circle group {T} can be changed.

In the following descriptions, it is assumed that the right half plane and the left half plane of the circle group are based on the state in FIG. 6A where the offset of 1/(4t) is added.

In the state where no offset is added in FIG. 6B, 0 (1) on the circle group {T} is within the slice from −1/(4t) to 1/(4t).

As illustrated in FIG. 6A, by adding the offset, the integer 0 can be associated with the slice (0/2t) starting from 0 on the circle group {T}. Another slice starts from X/2t (where X is a plaintext integer). As a result, 0 on the circle group is associated to refer to the 0th order term in a test vector polynomial used when a process using bootstrapping is performed, and thus adding the offset in the above-described manner has an advantage that the order of coefficients is natural and easy to see. However, adding the offset in the above-described manner is in principle not a mandatory requirement. Accordingly, by performing appropriate adjustment by a test vector, preprocessing, postprocessing, or the like, different offsets can be used.

In FIG. 6A, the plaintext with the offset added is located at the center of each slice (for example, the slice starting from 3/(2t)) with an error range of ±1/(4t). At this time, the average of normal distribution is, for example, 3/(2t)+1/(4t), and plaintexts are distributed within the error range of 1/(4t) in most cases. Accordingly, the plaintexts are distributed at the center of the slice starting from 3/(2t).

Although the plaintext with the offset added is illustrated only in the slice of 3/(2t) in FIG. 6A, this illustration is merely an example. A plaintext with the offset added to a value serving as a starting point is present in each slice.

The ciphertext in FIG. 6A divides the right half plane of the circle group {T} into t portions and the left half plane into t portions. The right half plane of the circle group {T} corresponds to 0 and positive plaintext integers (0 to t−1), and the left half plane corresponds to negative plaintext integers (−1 to −t). The width of one block (slice) is 1/(2t).

Integer values are respectively assigned to the slices obtained by dividing the range from 0 to 1 (−½ to ½) of the circle group {T} into 2t portions and starting from −t/(2t) to (t−1)/(2t), respectively.

Non-negative integers are assigned to slices starting from 0/(2t), 1/(2t), . . . , (t−3)/(2t), (t−2)/(2t), and (t−1)/(2t) of the right half plane, respectively. Negative integers are assigned to slices starting from −t/(2t), −(t−1)/(2t), −(t−2)/(2t) . . . , −1/(2t) of the left half plane, respectively.

These slices are each centered on a value obtained by adding the offset of +1/(4t) to the value serving as the starting point. The offset of 1/(4t) corresponds to half of the slice width of 1/(2t). When the offset of 1/(4t) is included in integer representation, it can be represented as an offset of +0.5 for convenience.

As illustrated in FIG. 6A, when 2t is set to 16 (t is set to 8) and the range of the circle group is divided into 16 portions, integers from 0 to 7 (=t−1) can be represented by the right half plane of the circle group {T}, and integers from −8(=−t) to −1 can be represented by the left half plane. That is, the entire ciphertext can represent integers of −8, −7, −6, −5, −4, −3, −2, −1, 0, 1, 2, 3, 4, 5, 6, and 7.

These integer values are respectively assigned to sections obtained by dividing the range of the circle group {T} into 2t=16 portions and starting from −8/(2t), −7/(2t), −6/(2t), −5/(2t), −4/(2t), −3/(2t), −2/(2t), −1/(2t), 0/(2t), 1/(2t), 2/(2t), 3/(2t), 4/(2t), 5/(2t), 6/(2t), and 7/(2t). Integers are successively assigned counterclockwise from the region starting from ½.

Considering the above-described offset of 0.5, the slice starting from 1/(2t) on the right half plane, for example, is the slice centered on 1.5/(2t), and the slice starting from −8/(2t) on the left half plane, for example, is the slice centered on −7.5/(2t). Integers represented to include the offset are −7.5, −6.5, −5.5, −4.5, −3.5−2.5, −1.5, −0.5, 0.5, 1.5, 2.5, 3.5, 4.5, 5.5, 6.5, and 7.5 counterclockwise from top.

The encryption processing apparatus 1 of the present embodiment realizes multiplication between Integer-wise type TLWE ciphertexts by the following method.

The encryption processing apparatus 1 uses the method called Quarter Square. Quarter Square obtains ab that is the result of multiplication of a and b by using the result of comparison between the expansion of $(a+b)^2$ and the expansion of $(a−b)^2$, that is, $$(a+b)^2 − (a−b)^2 = a^2 + 2ab + b^2 − (a^2 − 2ab + b^2) = 4ab.$$

Operations necessary for Quarter Square are the following four types of operations:

(1) Addition and subtraction between a and b, (a+b) and (a−b);

(2) Square of each of the addition result and the subtraction result between a and b, $(a+b)^2$ and $(a−b)^2$;

(3) Subtraction between the square of the addition result between a and b and the square of the subtraction result between a and b, $(a+b)^2-(a-b)^2$; and (4) Division of the subtraction result 4ab by 4 to obtain ab.

A case is considered where the operations corresponding to (1) to (4) are performed for ciphertexts of a and b.

Addition and subtraction between ciphertexts corresponding to addition and subtraction between a and b in (1) and addition and subtraction between ciphertexts corresponding to addition and subtraction between the squares in (3) can be performed in a homomorphic manner between TLWE ciphertexts.

Calculation of the square of a ciphertext in (2) and calculation of dividing a ciphertext by 4 in (4) (i.e., division by a plaintext integer) can be processed as a univariate function by using a lookup table (LUT). Therefore, multiplication using Quarter Square fits well to operations defined in TFHE.

From $(a+b)^2-(a-b)^2=4ab$ described above, the difference between the square of the addition result of a and b and the square of the subtraction result between a and b, $(a+b)^2-(a-b)^2$ always becomes a multiple of 4. In this case, both the square of (a+b) and the square of (a-b) are the same as each other in remainder of division by 4. Also when the quotient obtained by dividing the square of (a-b) by 4 and rounding off the remainder is subtracted from the quotient obtained by dividing the square of (a+b) by 4 and rounding off the remainder, a correct value is obtained which is the same as the quotient obtained by dividing the result of subtraction of the square of (a-b) from the square of (a+b) by 4.

Therefore, the encryption processing apparatus 1 performs operations between ciphertexts which respectively correspond to (a+b) and (a-b) in FIG. 2A, operations between ciphertexts which respectively correspond to (a+b)$^2$/4 and (a-b)$^2$/4 in FIG. 2B, and an operation between ciphertexts which corresponds to $(a+b)^2/4-(a-b)^2/4$ in FIG. 2C, thereby performing an operation between ciphertexts corresponding to the result of multiplication between the plaintexts a and b.

In particular, in a case where the processes in FIG. 2B are implemented by TFHE, it is preferable to store only the quotient of division of each of the square of (a+b) and the square of (a-b) by 4 in a LUT in advance.

However, when the sum (a+b) and the difference (a-b) are calculated for a and b before calculation of the squares, the range of a value after addition or subtraction is doubled.

In a case where calculation is performed using the right half plane of a circle group (a defined range of plaintext) (for example, by using only positive numbers) in a naive manner, it is necessary to refer to a LUT from the entire plane of the circle group corresponding to the doubled range.

Processing referring to a LUT by using Bootstrapping in TFHE is called Functional Bootstrapping. In particular, the method of referring to a LUT from the entire plane of a circle group is called FDFB (Full-Domain Functional Bootstrapping).

There are proposed various methods regarding FDFB. Quarter Square can be realized by any of the proposed methods. The present embodiment applies, as an example of FDFB, the method called TOTA disclosed in "TOTA: Fully Homomorphic Encryption with Smaller Parameters and Stronger Security (https://eprint.iacr.org/2021/1347)".

FIG. 7 is a diagram explaining a method of performing FDFB by the method called TOTA.

Originally, division for a point on a circle group is not defined. However, in implementation, it is possible to forc-ibly perform division by temporarily regarding the point on the circle group as a real number.

As illustrated in FIG. 7, a value 0.8 on the circle group {T} is regarded as a real number 0.8, for example. When this value is divided by 2, the quotient is 0.4.

In general, division is considered as an inverse operation of multiplication.

Therefore, even if it is defined that "an operation of obtaining r that satisfies 2r=0.8 on a circle group is called division", for example, this definition does not contradict other theories.

In this case, r can take two values of 0.4 and 0.9. This is because these two values respectively become 0.8 and 1.8 when being doubled, and the doubled values are both equal to 0.8 on the circle group {T}.

Division by 2 always has one solution on each of the right half plane and the left half plane of the circle group {T}, and an operation of forcibly performing division is always equal to selection of a value on the right half plane of the circle group {T}.

Here, it is assumed that there is a TLWE ciphertext cc configured by a combination ([a], b) of a vector [a] using a point on the circle group {T} and a scalar b.

It is assumed that a TLWE ciphertext cc' obtained by forcibly dividing all elements of the vector [a] of the TLWE ciphertext cc and the scalar b by 2 by using the method described above is ([a'], b').

As illustrated in FIG. 7, in a case where the plaintext value of the TLWE ciphertext cc on the circle group is 0.8, the plaintext value on the circle group of the TLWE ciphertext cc' obtained by forcibly dividing the TLWE ciphertext cc by 2 is 0.4 or 0.9, and it is unknown without decryption which one of these values the plaintext of the TLWE ciphertext cc' is.

When it is assumed that the value on the circle group of an original plaintext (the plaintext of the TLWE ciphertext cc) is p (0.8 in the above-described case), p=b-[s]·[a] (mod 1) is established.

Since (mod 1) represents a remainder of division by 1, only the decimal part of b-[s]·[a] is obtained. It can be interpreted that only the decimal parts are equal to each other on the left and right of the equal sign.

That is, any integer n exists, and p=b-[s]·[a]+n is established as calculation in the world of real numbers.

Here, [a'] and b' of the TLWE ciphertext cc' are substituted into p=b-[s]·[a]+n.

Since the quotient of division of ([a], b) by 2 is ([a'], b'), [a]=2[a'] and b=2b'.

As a result of substitution, p=b-[s]·[a]+n=2b'-2[s]·[a']+n. From p/2=(2b'-2[s]·[a']+n)/2, p/2 is b'-[s]·[a']+n/2.

Since this equation is established in the world of real numbers, it is natural that the decimal parts on the left and right of the equal sign are also equal to each other. Therefore, p/2=b'-[s]·[a']+n/2(mod 1) is also established naturally.

After transposition, p/2-n/2=b'-[s]·[a']. The right side is the plaintext of the TLWE ciphertext cc'. Therefore, the plaintext of the TLWE ciphertext cc' is p/2-n/2.

Here, since n is an "integer" that is unknown but exists as any value, the decimal part of n/2 is 0 or 0.5.

Therefore, the plaintext of the TLWE ciphertext cc' is p/2 or p/2+0.5.

p/2-0 is p/2, and p/2-0.5 is p/2+0.5 because -0.5 and 0.5 are equal to each other on the circle group.

Here, the decimal part of n/2 that is 0 or 0.5 is assumed as u. In this case, u is equivalent to information indicating whether the integer n is even or odd. The decimal part u of n/2 is 0 when the integer n is even, and is 0.5 when the integer n is odd, and vice versa.

The plaintext of the TLWE ciphertext cc' is p/2+u when being represented by using u.

Although the information indicating whether the plaintext of the TLWE ciphertext cc' is p/2 or p/2+0.5 is encrypted, it can be obtained from the fact whether the plaintext is present on the right half plane of the circle group {T} or the left half plane.

Specifically, Bootstrapping is performed for the TLWE ciphertext cc' by using a flat test vector polynomial in which all coefficients are ¼, thereby obtaining the TLWE ciphertext cd. Accordingly, the TLWE ciphertext cd is obtained which has ¼ as a plaintext when the plaintext is present on the right half plane and has −¼ as a plaintext when the plaintext is present on the left half plane. The TLWE ciphertext cd is a ciphertext that indicates whether the plaintext of the TLWE ciphertext cc' is present on the right half plane or the left half plane.

The TLWE ciphertext cd has u+¼ as a plaintext. A TLWE ciphertext cc'+cd obtained by adding the TLWE ciphertext cd to the TLWE ciphertext cc' in a homomorphic manner has p/2+¼ as a plaintext as a result of disappearing of the unknown value u as represented by (p/2+u)+(u+¼)=p/2+¼.

Further, when a trivial ciphertext (0, ¼) is subtracted from the TLWE ciphertext cc'+cd in a homomorphic manner (cc'+cd−(0, ¼)), a TLWE ciphertext having p/2 as a plaintext is obtained.

Accordingly, even in a case where the plaintext p of the original ciphertext (the TLWE ciphertext cc) takes a value in a full domain (the entire range from 0 to 1 of the circle group), the range of plaintext can be reduced to the right half plane (from 0 to 0.5) regarding the TLWE ciphertext cc'. In association with reduction of the entire range of plaintext by half, the width of each slice is reduced by half.

In a case where the TLWE ciphertext cc has the plaintext on the entire circle group, the TLWE ciphertext cc' uses only the right half plane of the circle group as the range of plaintext.

Since only the right half plane of the circle group is used in this state, it suffices that a test vector polynomial for which the size of slice is reduced by half similarly is created from a LUT and Bootstrapping is performed as usual.

The number of times of BlindRotate that accounts for a large part of a calculation time is twice in total, that is, once for obtaining the TLWE ciphertext cd and once for actually referring to the LUT.

In a case of performing multiplication by Quarter Square, FDFB has to be performed twice in total in order to refer to each of a table for division by 4 of the square of the result of addition of x and y and a table for division by 4 of the square of the result of subtraction between x and y. The number of times of BlindRotate necessary for one FDFB is twice as described above. Therefore, in a simple configuration, the number of times of BlindRotate necessary for whole multiplication is four times.

The present embodiment further speeds up this processing.

The method of multiplication between ciphertexts according to the present embodiment is described.

The encryption processing apparatus 1 sets a system parameter in TFHE. At this time, the encryption processing apparatus 1 sets the system parameter in such a manner that the range of an error added to a plaintext is less than ±1/(8t²) in a ciphertext obtained after Gate Bootstrapping.

It is assumed that there are a TLWE ciphertext ca as a multiplicand and a TLWE ciphertext cb as a multiplier.

The TLWE ciphertexts ca and cb as the multiplier and the multiplicand are TLWE ciphertexts having the configuration illustrated in FIG. 6A and each divide the right half plane into t portions and the entire circle group {T} into 2t portions.

As for each of the TLWE ciphertext ca and the TLWE ciphertext cb, the right half plane of the circle group {T} can be associated with a plaintext that is a non-negative integer, and the left half plane can be associated with a plaintext that is a negative integer.

However, in the present embodiment, only the right half plane is used as the range of plaintext of the TLWE ciphertext ca and the TLWE ciphertext cb.

The TLWE ciphertext ca has a real number a/(2t)+1/(4t) corresponding to the integer a that cannot be known without a private key, as its plaintext.

The TLWE ciphertext cb has a real number b/(2t)+1/(4t) corresponding to the integer b that cannot be known without a private key, as its plaintext.

The fact that the plaintexts of the TLWE ciphertexts ca and cb are a/(2t) and b/(2t), respectively, is based on that the entire circle group is divided into 2t portions. As described above, the offset of +1/(4t) added to the plaintext associates the slice starting from 0 on the circle group with the integer 0 and also locates the plaintext at the center of the slice. This offset is optional.

Since multiplication is commutative, the multiplier and the multiplicand, that is, the plaintext integers a and b can be interchanged, and the TLWE ciphertexts ca and cb can be interchanged.

As described for FIG. 6A, the offset is also added to the plaintext in each of the TLWE ciphertext ca and the TLWE ciphertext cb, as represented by a/(2t)+1/(4t) and b/(2t)+1/(4t).

As a result of multiplication between ciphertexts each including the offset added to the plaintext, an offset corresponding to a value that is the product of multiplication between those offsets is added to the plaintext of the multiplication result. This offset component disappears in a subsequent operation, and therefore does not affect the operation result (the multiplication result).

The value 1/(4t) of the offset is merely an example, and is not limited thereto. In accordance with the value of the offset, it is necessary to adjust a polynomial and a parameter.

In FIG. 6A, the left half plane of the circle group {T}, which handles negative numbers, can represent integers from −t to −1 by using slices from the slice starting from −t/(2t) to the slice starting from −1/(2t) counterclockwise from top.

The right half plane of the circle group {T}, which handles 0 and positive numbers (non-negative numbers), can represent integers from 0 to t−1 by using slices from the slice starting from 0/(2t) to the slice starting from (t−1)/(2t) in the counterclockwise direction from bottom.

It is assumed that the TLWE ciphertexts ca and cb that are to be subjected to multiplication in the present embodiment each have the plaintext only on the right half plane of the circle group {T} in FIG. 6A.

A process of multiplication between ciphertexts to which the method of Quarter Square is applied is described in detail with reference to FIGS. 2A to 2C and the above description of FDFB.

In FIG. 2A, the encryption processing apparatus 1 obtains ciphertexts respectively corresponding to (a+b) and (a−b).

The encryption processing apparatus 1 (the sixth operation unit 41) divides coefficients in the TLWE ciphertext ca by 2 to obtain the new TLWE ciphertext ca'.

The encryption processing apparatus 1 (the seventh operation unit 42) divides coefficients in the TLWE ciphertext cb by 2 to obtain the new TLWE ciphertext cb'.

As described above, the plaintext of the TLWE ciphertext ca is a/(2t)+1/(4t), and the plaintext of the TLWE ciphertext cb is b/(2t)+1/(4t).

Therefore, the TLWE ciphertext ca' has a/(4t)+1/(8t)+u as a plaintext, and the TLWE ciphertext cb' has b/(4t)+1/(8t)+u' as a plaintext, where u and u' are values appearing when a ciphertext is divided by 2 as described in the above description of FDFB.

The u component appearing when dividing the coefficients in the TLWE ciphertext cb by 2 is represented as u' for being distinguished from the other u component.

The plaintexts of the TLWE ciphertexts ca' and cb' are half those of the plaintexts of the TLWE ciphertexts ca and cb before division of the coefficients by 2, and u (u') that is information indicating whether n is even or odd, which has disappeared because of the operation (mod 1) on the circle group {T}, appears as 0 or 0.5.

The encryption processing apparatus 1 (the first operation unit 12) performs the first homomorphic operation (ca'+cb'−(0, 1/(8t))) for the TLWE ciphertext ca' and the TLWE ciphertext cb' to obtain the new TLWE ciphertext cc1.

The encryption processing apparatus 1 (the second operation unit 13) performs the second homomorphic operation (ca'−cb'+(0, 1/(8t))) for the TLWE ciphertext ca' and the TLWE ciphertext cb' to obtain the new TLWE ciphertext cc2.

The TLWE ciphertext cc1 obtained by the first homomorphic operation (homomorphic addition) has (a+b)/(4t)+1/(8t)+u+u' as a plaintext from a/(4t)+1/(8t)+u+b/(4t)+1/(8t)+u'−(0, 1/(8t)).

The TLWE ciphertext cc2 obtained by the second homomorphic operation (homomorphic subtraction) has (a−b)/(4t)+1/(8t)+u−u' as a plaintext from a/(4t)+1/(8t)+u−(b/(4t)+1/(8t)+u')+(0, 1/(8t)).

The trivial TLWE ciphertext (0, 1/(8t)) added and subtracted in these homomorphic addition and subtraction is a non-essential offset for aligning the boundary of slices with 0 on the circle group. This offset is omitted in the following description.

Here, 0.5=−0.5 is established on the circle group {T}. This fact can be interpreted as meaning that points that run half around from the point 0 on the circle group {T} clockwise and counterclockwise, respectively, are the same.

From the above description, since u and u' can take 0 or 0.5 only, u=−u (when u is 0, 0=0, and when u is 0.5, 0.5=−0.5), and u'=−u' (when u' is 0, 0=0, and when u' is 0.5, 0.5=−0.5), on the circle group {T}.

Therefore, the component u+u' and the component u−u' respectively included in the plaintexts of the TLWE ciphertexts cc1 and cc2 are always the same values. Further, u+u' can take either 0 or 0.5 only.

When u is 0 and u' is 0, u+u'=0 and u−u'=0.
When u is 0 and u' is 0.5, u+u'=0.5 and u−u'=−0.5+0.5.
When u is 0.5 and u' is 0, u+u'=0.5 and u−u'=0.5.
When u is 0.5 and u' is 0.5, u+u'=1-0 and u−u'=0.

Therefore, u+u' can be considered as a component u" that is an unknown value of 0 or +0.5.

The TLWE ciphertext cc1 corresponding to the sum of the TLWE ciphertext ca and the TLWE ciphertext cb and the TLWE ciphertext cc2 corresponding to the difference between the TLWE ciphertext ca and the TLWE ciphertext cb both use the entire plane of the circle group {T} as the range of plaintext.

Accordingly, the encryption processing apparatus 1 performs a process of reducing the range of plaintext of the TLWE ciphertexts cc1 and cc2 to the right half plane of the circle group {T}.

The encryption processing apparatus 1 (the first Bootstrapping unit 17) performs the first Bootstrapping using a flat first test vector polynomial in which all coefficients are ¼ for either the TLWE ciphertext cc1 or the TLWE ciphertext cc2 to obtain the TLWE ciphertext cd. The TLWE ciphertext cd is a ciphertext indicating whether the TLWE ciphertext cc1 or cc2 has a plaintext on the right half plane or the left half plane, as with the ciphertext described above in relation to FDFB.

The TLWE ciphertext cd can be obtained based on only either one of the TLWE ciphertexts cc1 and cc2.

The encryption processing apparatus 1 (the third operation unit 14) performs the third homomorphic operation that adds the TLWE ciphertext cd to the TLWE ciphertext cc1 in a homomorphic manner to obtain the new TLWE ciphertext cc1' described in FIG. 8A.

The encryption processing apparatus 1 (the fourth operation unit 15) performs the fourth homomorphic operation that adds the TLWE ciphertext cd to the TLWE ciphertext cc2 in a homomorphic manner to obtain the new TLWE ciphertext cc2' described in FIG. 8B.

As described above, the TLWE ciphertext cd is a ciphertext which has ¼ as a plaintext when the plaintext is present on the right half plane and has −¼ as a plaintext when the plaintext is present on the left half plane. The first test vector polynomial may be configured to make the TLWE ciphertext cd have −¼ as a plaintext when the plaintext is present on the right half plane and ¼ as a plaintext when the plaintext is present on the left half plane. In that case, The TLWE ciphertexts cc1' and cc2' may be obtained by subtracting the TLWE ciphertext cd from the TLWE ciphertext cc1 or cc2 in a homomorphic manner. The same is applied to the following cases.

From the above discussion, u"=u+u'=u−u'. The plaintext of the TLWE ciphertext cd satisfies u"+¼=u+u'+¼=u−u'+¼ at the same time.

Therefore, the TLWE ciphertext cc1' has (a+b)/(4t)+1/(8t) as a plaintext from $$(a+b)/(4t) + 1/(8t) + u + u' + \left(u + u' + 1/4\right) - \left(0, 1/4\right) =$$
$$(a+b)/(4t) + 1/(8t) + u + u' + \left(u - u' + 1/4\right) - \left(0, 1/4\right) =$$
$$(a+b)/(4t) + 1/(8t) + u + u + 1/4 - \left(0, 1/4\right) = (a+b)/(4t) + 1/(8t),$$

where u+u is either one of 0 and 1 that are both 0 as a value on the circle group.

Further, the TLWE ciphertext cc2' has (a−b)/(4t)+1/(8t) as a plaintext from $$(a-b)/(4t) + 1/(8t) + u - u' + \left(u - u' + 1/4\right) - \left(0, 1/4\right) =$$
$$(a-b)/(4t) + 1/(8t) + u - u' + \left(u + u' + 1/4\right) - \left(0, 1/4\right) =$$
$$(a-b)/(4t) + 1/(8t) + u + u + 1/4 - \left(0, 1/4\right) = (a-b)/(4t) + 1/(8t),$$

where u+u is either one of 0 and 1 that are both 0 as a value on the circle group.

FIGS. 8A and 8B are explanatory diagrams of a ciphertext for which the range of plaintext is reduced.

As illustrated in FIG. 8A, the TLWE ciphertext cc1' is a ciphertext obtained by reducing the range of the ciphertext cc1 that is the sum of the TLWE ciphertext ca and the TLWE ciphertext cb both using the entire plane of the circle group {T} to the right half plane of the circle group {T}.

The result of addition between the TLWE ciphertext ca and the TLWE ciphertext cb that can take 0 to 7 as a plaintext integer does not take a negative value. Accordingly, the TLWE ciphertext cc1 corresponding to the addition result can take any of 0 to 14 as a plaintext integer.

Therefore, as illustrated in FIG. 8A, as for the TLWE ciphertext cc1', the plaintext integers from 0 to 14 are assigned to the regions (slices) of 0/(4t) to 14/(4t) in the right half plane of the circle group. The range of 15/(4t) is not used.

In order to obtain the TLWE ciphertext cc1', the sum of the TLWE ciphertext ca and the TLWE ciphertext cb is obtained, and the range of ciphertext is reduced to the right half plane, and the width of each slice is reduced by half Therefore, the width of each slice in the circle group {T}, which corresponds to the TLWE ciphertext cc1', is 1/(4t) that is half 1/(2t) for the TLWE ciphertext ca and the TLWE ciphertext cb.

As illustrated in FIG. 8B, the TLWE ciphertext cc2' is a ciphertext obtained by reducing the range of the ciphertext cc2 that is the difference between the TLWE ciphertext ca and the TLWE ciphertext cb both using the entire plane of the circle group {T} to the right half plane of the circle group {T}.

The result of subtraction between the TLWE ciphertext ca and the TLWE ciphertext cb that can take 0 to 7 as a plaintext integer can take a negative value.

Accordingly, the TLWE ciphertext cc2 corresponding to the subtraction result can take any of −7 to −1 and 0 to 7 as a plaintext integer.

Therefore, as illustrated in FIG. 8B, as for the TLWE ciphertext cc2', the plaintext integers from −7 to 7 are assigned to the regions of 0/(4t) to 15/(4t) in the right half plane of the circle group.

In order to obtain the TLWE ciphertext cc2', the difference between the TLWE ciphertext ca and the TLWE ciphertext cb is obtained, and the range of ciphertext is reduced to the right half plane, and the width of each slice is reduced by half Therefore, the width of each slice in the circle group {T}, which corresponds to the TLWE ciphertext cc2', is 1/(4t) that is half of 1/(2t) for the TLWE ciphertext ca and the TLWE ciphertext cb.

However, when the range of ciphertext is reduced to the right half plane, values from 0 to 1 that correspond to the entire range of the circle group are reduced to the right half plane, that is, a range of 0 to 0.5 in an order unchanged. Therefore, values from 0 to 0.5 of the TLWE ciphertext cc2 on the circle group (corresponding to plaintext integers from 0 to 7) are reduced to a range of 0 to 0.25 for the TLWE ciphertext cc2'. Similarly, values from 0.5 to 1 of the TLWE ciphertext cc2 on the circle group (corresponding to plaintext integers from −8 to −1) are reduced to a range of 0.25 to 0.5 for the TLWE ciphertext cc2'. Therefore, for the TLWE ciphertext cc2', 0, 1, 2, 3, 4, 5, 6, 7, −8, −7, −6, −5, −4, −3, −2, and −1 are arranged counterclockwise from 0 on the circle group in that order.

Obtaining the TLWE ciphertext cc1' and the TLWE ciphertext cc2' by the above processing is equivalent to obtaining ciphertexts respectively corresponding to (a+b) and (a−b). The number of times of BlindRotate necessary for this processing is only once, that is, when the TLWE ciphertext cd is obtained by using the first test vector polynomial.

In FIG. 2B, the encryption processing apparatus 1 obtains ciphertexts respectively corresponding to $(a+b)^2/4$ and $(a-b)^2/4$.

The encryption processing apparatus 1 calculates the quotient of division of the square of (a+b) by 4 by rounding off the remainder and also calculates the quotient of division of the square of (a−b) by 4 by rounding off the remainder.

The encryption processing apparatus 1 (the second Bootstrapping unit 18) performs the second Bootstrapping (Functional Bootstrapping) using the second test vector polynomial $T_p(X)$ $$T_p(X) = \sum_{i=0}^{2t-1} \frac{\left\lfloor \frac{i^2}{4} \right\rfloor}{2t^2} \left( \sum_{j=0}^{n/2t-1} X^{\frac{n}{2t}i+j} \right)$$

for the TLWE ciphertext cc1'.

Calculated values of coefficients in the second test vector polynomial $T_p(X)$ are stored in a LUT in advance, and are referred to by BlindRotate.

As a result, the encryption processing apparatus 1 obtains the TLWE ciphertext cf1 having $$\frac{\left\lfloor \frac{(a+b)^2}{4} \right\rfloor}{2t^2}$$

as a plaintext.

Further, the encryption processing apparatus (the third Bootstrapping unit 19) 1 performs the third Bootstrapping (Functional Bootstrapping) using the third test vector polynomial $T_m(X)$ $$T_m(X) = \sum_{i=0}^{t-1} \frac{\left\lfloor \frac{i^2}{4} \right\rfloor}{2t^2} \left( \sum_{j=0}^{n/2t-1} X^{\frac{n}{2t}i+j} \right) + \sum_{i=t}^{2t-1} \frac{\left\lfloor \frac{(2t-i)^2}{4} \right\rfloor}{2t^2} \left( \sum_{j=0}^{n/2t-1} X^{\frac{n}{2t}i+j} \right)$$

for the TLWE ciphertext cc2'.

Calculated values of coefficients in the third test vector polynomial $T_m(X)$ are stored in a LUT in advance, and are referred to by BlindRotate.

As a result, the encryption processing apparatus 1 obtains the TLWE ciphertext cf2 having $$\frac{\left\lfloor \frac{(a-b)^2}{4} \right\rfloor}{2t^2}$$

as a plaintext.

Accordingly, the TLWE ciphertext cf1 corresponding to $(a+b)^2/4$ and the TLWE ciphertext cf2 corresponding to $(a-b)^2/4$ are obtained.

In the above calculation, two types of test vector polynomials $T_p(X)$ and $T_m(X)$ are used because the order is different between the case of obtaining the sum and the case of obtaining the difference.

The test vector polynomial $T_p(X)$ essentially has $$\left\lfloor \frac{\left\lfloor \frac{(a+b)^2}{4} \right\rfloor}{2t^2} \right\rfloor$$

(where t is a division number) as a coefficient that has a value (an integer symbol value) of $$\left\lfloor \frac{(a+b)^2}{4} \right\rfloor$$

as the numerator. Further, the test vector polynomial $T_m(X)$ has $$\left\lfloor \frac{\left\lfloor \frac{(a+b)^2}{4} \right\rfloor}{2t^2} \right\rfloor$$

as a coefficient that has a value (an integer symbol value) of $$\left\lfloor \frac{(a-b)^2}{4} \right\rfloor$$

as the numerator.

Since BlindRotate is performed in order to refer to a LUT once in each of addition and subtraction, the number of times of BlindRotate necessary for obtaining the TLWE ciphertext cf1 and the TLWE ciphertext cf2 is twice.

In FIG. 2C, the encryption processing apparatus 1 obtains a ciphertext corresponding to $(a+b)^2/4-(a-b)^2/4$, that is, the multiplication result.

The encryption processing apparatus 1 (the fifth operation unit 16) subtracts the TLWE ciphertext cf2 from the TLWE ciphertext cf1 in a homomorphic manner to obtain the TLWE ciphertext cg.

Homomorphic subtraction that subtracts the TLWE ciphertext cf2 from the TLWE ciphertext cf1 corresponds to an operation $$\frac{\left\lfloor \frac{(a+b)^2}{4} \right\rfloor - \left\lfloor \frac{(a-b)^2}{4} \right\rfloor}{2t^2}$$

between the plaintexts.

When the operation between the plaintexts is performed, $$\frac{\left\lfloor \frac{(a+b)^2}{4} \right\rfloor - \left\lfloor \frac{(a-b)^2}{4} \right\rfloor}{2t^2} =$$

$$\frac{\left\lfloor \frac{(a+b)^2}{4} - \frac{(a-b)^2}{4} \right\rfloor}{2t^2} = \frac{\left\lfloor \frac{(a+b)^2 - (a-b)^2}{4} \right\rfloor}{2t^2} = \frac{\left\lfloor \frac{4ab}{4} \right\rfloor}{2t^2} = \frac{ab}{2t^2}.$$

The TLWE ciphertext cg has $ab/2t^2$ as a plaintext, and the multiplication result is obtained.

The encryption processing apparatus 1 was able to obtain the ciphertext of the multiplication result by performing BlindRotate three times. The number of times of BlindRotate can be reduced by one as compared with four times in a case where FDBD is simply performed twice as described at the beginning.

Second Example

In the first example, the multiplication result obtained as the TLWE ciphertext cg has $2t^2$ as the denominator of the plaintext which is different from 2t as the denominator of the plaintexts of the TLWE ciphertexts ca and cb serving as the multiplier and the multiplicand. The TLWE ciphertext cg having such a denominator cannot be used in subsequent multiplication with another ciphertext having 2t as the denominator of the plaintext.

In a second example, the encryption processing apparatus 1 decomposes the ciphertext of the multiplication result into lower and upper bits. In more detail, the encryption processing apparatus 1 of the second example obtains a ciphertext of lower bits and a ciphertext of upper bits of the multiplication result.

The lower bits and the upper bits of the multiplication result are respectively a predetermined number of lower bits and the remaining bits when the multiplication result is expressed in binary. This is the expression when t is a power of 2. For a different value, only the expression is changed while what is meant by the lower bits and the upper bits is essentially unchanged.

The lower bits and the upper bits respectively correspond to the remainder and the quotient of division of the multiplication result (ab) by t.

Figure 9:
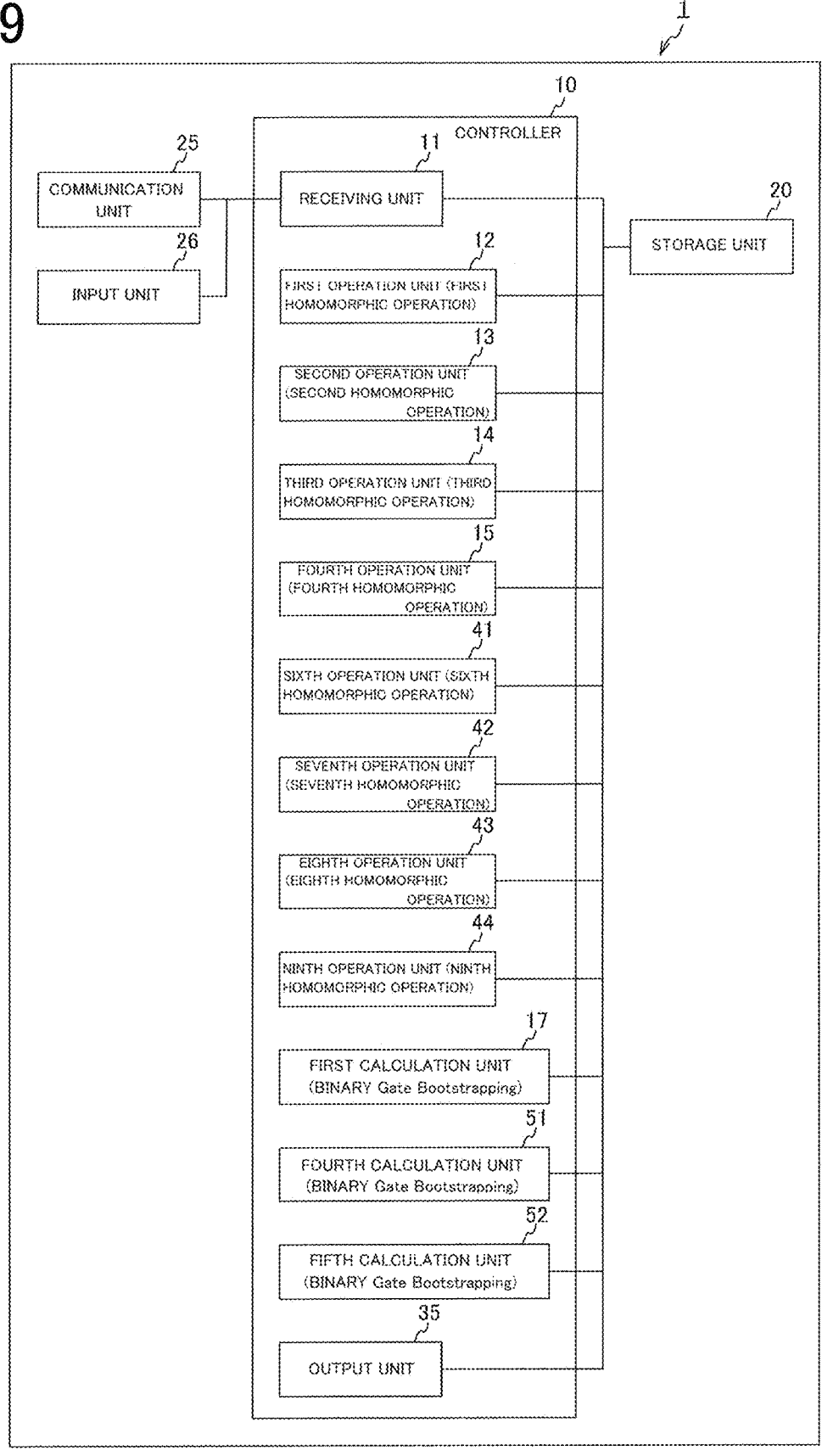
FIG. 9 is an explanatory diagram of a functional configuration of an encryption processing apparatus according to a second example of the present embodiment.

FIG. 9 is an explanatory diagram of a functional configuration of an encryption processing apparatus according to the second example of the present embodiment.

Figure 10A:
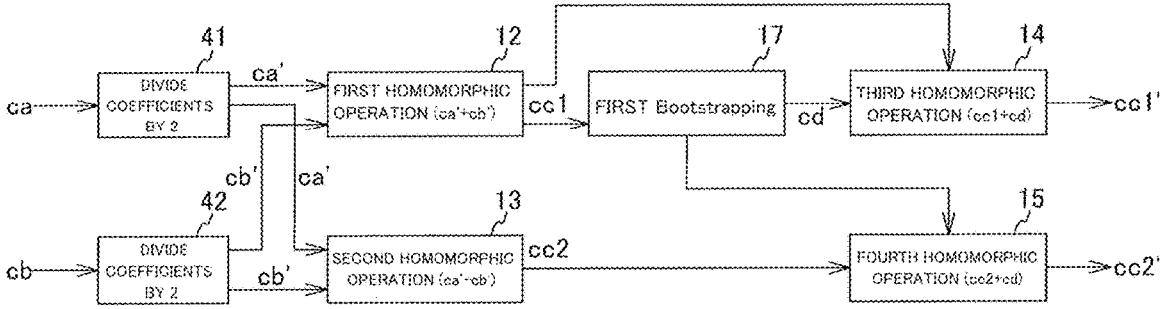
FIGS. 10A to 10C are explanatory diagrams of operation processes based on the functional configuration in FIG. 9.
Figure 10B:
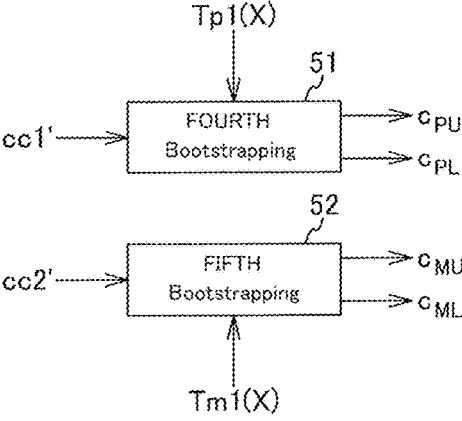
Figure 10C:
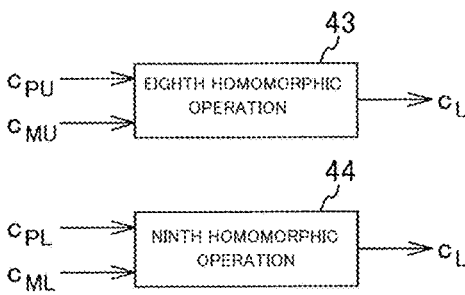

FIGS. 10A to 10C are explanatory diagrams of operation processes based on the functional configuration in FIG. 9.

The second example illustrated in FIGS. 9 and 10A to 10C is different from the first example illustrated in FIGS. 1 and 2A to 2C in including an eighth operation unit 43, a ninth operation unit 44, a fourth calculation unit 51, and a fifth calculation unit 52 in place of the second calculation unit 18, the third calculation unit 19, and the fifth operation unit 16.

The processes in (A) for obtaining the TLWE ciphertexts cc1' and cc2' are the same as those in the first example.

In the processes in (B), the encryption processing apparatus 1 decomposes the content of a LUT in advance into a LUT for lower bits and a LUT for upper bits in order to obtain a TLWE ciphertext corresponding to $(a+b)^2/4$ and a TLWE ciphertext corresponding to $(a-b)^2/4$.

The encryption processing apparatus 1 refers to the LUT for lower bits and the LUT for upper bits in one BlindRotate by using the method of many LUT. Therefore, it is possible to obtain a ciphertext of upper bits of a multiplication result and a ciphertext of lower bits of the multiplication result without increasing the number of times of BlindRotate. The manyLUT is a process that uses a common TLWE ciphertext and performs BlindRotate for different test vector polynomials (refers to different LUTs).

Regarding $(a+b)^2/4$, the encryption processing apparatus 1 sets $$\frac{\left\lfloor \frac{(a+b)^2}{4} \right\rfloor \bmod t}{2t}$$

corresponding to the lower bits of the multiplication result of a and b as coefficients of odd-order terms in the fourth test vector polynomial $T_{p1}(X)$ and stores calculated values of those coefficients in an odd-order LUT (LUT for lower bits) in advance.

$$\frac{\left\lfloor \frac{(a+b)^2}{4} \right\rfloor \bmod t}{2t}$$

is the remainder of division of $(a+b)^2/4$ by t and corresponds to the lower bits of $(a+b)^2/4$.

Further, regarding $(a+b)^2/4$, the encryption processing apparatus 1 sets $$\frac{\left\lfloor \frac{(a+b)^2}{4} \middle/ t \right\rfloor}{2t}$$

corresponding to the upper bits of the multiplication result of a and b as coefficients of even-order terms in the fourth test vector polynomial $T_{p1}(X)$ and stores calculated values of those coefficients in an even-order LUT (LUT for upper bits) in advance.

$$\frac{\left\lfloor \frac{(a+b)^2}{4} \middle/ t \right\rfloor}{2t}$$

is the quotient of division of $(a+b)^2/4$ by t and corresponds to the upper bits of $(a+b)^2/4$.

Further, regarding $(a-b)^2/4$, the encryption processing apparatus 1 sets $$\frac{\left\lfloor \frac{(a-b)^2}{4} \right\rfloor \bmod t}{2t}$$

corresponding to the lower bits of the multiplication result of a and b as coefficients of odd-order terms in the fifth test vector polynomial $T_{m1}(X)$ and stores calculated values of those coefficients in a LUT for lower bits in advance.

$$\frac{\left\lfloor \frac{(a-b)^2}{4} \right\rfloor \bmod t}{2t}$$

is the remainder of division of $(a-b)^2/4$ by t and corresponds to the lower bits of $(a-b)^2/4$.

Furthermore, regarding $(a-b)^2/4$, the encryption processing apparatus 1 sets $$\frac{\left\lfloor \frac{(a-b)^2}{4} \middle/ t \right\rfloor}{2t}$$

corresponding to the upper bits of the multiplication result of a and b as coefficients of even-order terms in the fifth test vector polynomial $T_{m1}(X)$ and stores calculated values of those coefficients in a LUT for upper bits in advance.

$$\frac{\left\lfloor \left\lfloor \frac{(a-b)^2}{4} \right\rfloor \middle/ t \right\rfloor}{2t}$$

is the quotient of division of $(a-b)^2/4$ by t and corresponds to the upper bits of $(a-b)^2/4$.

On the contrary, the coefficients of even-order terms in the test vector polynomial $T_{p1}(X)$ and the test vector polynomial $T_{m1}(X)$ may be made to correspond to the lower bits of $(a+b)^2/4$ and $(a-b)^2/4$, respectively, and the coefficients of odd-order terms may be made to correspond to the upper bits. In the present embodiment, however, the description is provided assuming that the coefficients of even-order terms are made to correspond to the upper bits, and the coefficients of odd-order terms are made to correspond to the lower bits.

The encryption processing apparatus 1 (the fourth Bootstrapping unit 51) performs fourth Bootstrapping (Functional Bootstrapping) using the above test vector polynomial $T_{p1}(X)$ for the TLWE ciphertext cc1'.

In this process, the encryption processing apparatus 1 can refer to the LUT for upper bits (the even-order LUT) and the LUT for lower bits (the odd-order LUT) at the same time by many LUT.

Since the calculation result of the square of any integer is always non-negative and t is a positive value, the sign is not changed by division by 4 or t, a floor function, or a remainder operation.

Therefore, all coefficients $$\frac{\left\lfloor \left\lfloor \frac{(a+b)^2}{4} \right\rfloor \middle/ t \right\rfloor}{2t}$$

and $$\frac{\left\lfloor \frac{(a+b)^2}{4} \right\rfloor \bmod t}{2t}$$

in the fourth test vector polynomial $T_{p1}(X)$ are always non-negative, and the numerators thereof are smaller than t. Accordingly, only the right half plane of the circle group {T} is used.

As a result of the fourth Bootstrapping by many LUT performed for the TLWE ciphertext cc1', the encryption processing apparatus 1 obtains a TLWE ciphertext $c_{PU}$ on the even-order side (the upper bits=quotient) and a TLWE ciphertext $c_{PL}$ on the odd-order side (the lower bits=remainder).

The encryption processing apparatus 1 (the fifth Bootstrapping unit 52) performs fifth Bootstrapping (Functional Bootstrapping) using the fifth test vector polynomial $T_{m1}(X)$ for the TLWE ciphertext cc2'. In this process, the encryption processing apparatus 1 can refer to the LUT for upper bits and the LUT for lower bits at the same time by many LUT.

Since the calculation result of the square of any integer is always non-negative and t is a positive value, the sign is not changed by division by 4 or t, a floor function, or a remainder operation.

33

Therefore, all coefficients $$\frac{\left\lfloor \left\lfloor \frac{(a-b)^2}{4} \right\rfloor / t \right\rfloor}{2t}$$

and $$\frac{\left\lfloor \frac{(a-b)^2}{4} \right\rfloor \bmod t}{2t}$$

in the test vector polynomial $T_{m1}(X)$ are always non-negative, and the numerators thereof are always smaller than t because division by t has been performed. Accordingly, only the right half plane of the circle group $\{T\}$ is used.

As a result of the fifth Bootstrapping using many LUT performed for the TLWE ciphertext cc2', the encryption processing apparatus 1 obtains a TLWE ciphertext $c_{MU}$ on the even-order side (the upper bits=quotient) and a TLWE ciphertext $c_{ML}$ on the odd-order side (the lower bits=remainder).

Regarding (C), the coefficients in the test vector polynomial $T_{p1}(X)$ and the test vector polynomial $T_{m1}(X)$ have been decomposed into the quotient and the remainder of division of $(a+b)^2/4$ and $(a-b)^2/4$ by t, respectively. Therefore, the ciphertext for $(a+b)^2/4$ is decomposed into the TLWE ciphertext $c_{PU}$ as the quotient and the TLWE ciphertext $c_{PL}$ as the remainder in the second example.

The ciphertext for $(a-b)^2/4$ is decomposed into the TLWE ciphertext $c_{MU}$ as the quotient and the TLWE ciphertext $c_{ML}$ as the remainder in the second example.

Accordingly, when $t \times c_{PU} + c_{PL}$ is calculated for the TLWE ciphertext $c_{PU}$ and the TLWE ciphertext $c_{PL}$, the plaintext of the calculation result matches the plaintext $$\frac{\left\lfloor \frac{(a+b)^2}{4} \right\rfloor}{2t}$$

of the ciphertext cf1 in the first example.

Further, when $t \times c_{MU} + c_{ML}$ is calculated for the TLWE ciphertext $c_{MU}$ and the TLWE ciphertext $c_{ML}$, the plaintext of the calculation result matches the plaintext $$\frac{\left\lfloor \frac{(a-b)^2}{4} \right\rfloor}{2t}$$

of the ciphertext cf2 in the first example.

The encryption processing apparatus 1 (the eighth operation unit 43) subtracts the TLWE ciphertext $c_{MU}$ corresponding to the quotient for $(a-b)^2/4$ from the TLWE ciphertext $c_{PU}$ corresponding to the quotient for $(a+b)^2/4$ (performs $c_{PU}-c_{MU}$) in a homomorphic manner to obtain a TLWE ciphertext cu corresponding to the upper bits of the multiplication result.

Further, the encryption processing apparatus 1 (the ninth operation unit 44) subtracts the TLWE ciphertext CML corresponding to the remainder for $(a-b)^2/4$ from the TLWE ciphertext $c_{PL}$ corresponding to the remainder for $(a+b)^2/4$ (performs $c_{PL}-c_{ML}$) in a homomorphic manner to obtain a TLWE ciphertext $c_L$ corresponding to the lower bits of the multiplication result.

Here, when the plaintext that is a combination of the upper and lower bits is calculated, $$\phi(t \times c_U + c_L) = \phi(t \times (c_{PU} - c_{MU}) + (c_{PL} - c_{ML})) = \phi((t \times c_{PU} + c_{PL}) - (t \times c_{MU} + c_{ML})) = \phi(t \times c_{PU} + c_{PL}) - \phi(t \times c_{MU} - c_{ML}).$$

Therefore, $$\frac{\left\lfloor \frac{(a+b)^2}{4} \right\rfloor - \left\lfloor \frac{(a-b)^2}{4} \right\rfloor}{2t} =$$

$$\frac{\left\lfloor \frac{(a+b)^2}{4} - \frac{(a-b)^2}{4} \right\rfloor}{2t} = \frac{\left\lfloor \frac{(a+b)^2-(a-b)^2}{4} \right\rfloor}{2t} = \frac{\left\lfloor \frac{4ab}{4} \right\rfloor}{2t} = \frac{ab}{2t}$$

can be confirmed, where $\phi$ represents a decryption function, and a value obtained by $\phi(\ )$ is the plaintext of a ciphertext.

Therefore, the TLWE ciphertext $c_U$ and the TLWE cyphertext $c_L$ have values obtained by decomposition of the result of calculation of ab/2t into upper and lower bits as a plaintexts, respectively.

The TLWE ciphertext $c_U$ and the TLWE ciphertext $c_L$ are ciphertexts serving as the upper and lower bits of the multiplication result, respectively. Since the denominator of the plaintexts thereof is 2t, these ciphertexts can be used in subsequent multiplication with another ciphertext having 2t as the denominator of the plaintext.

From the above processes, the ciphertext cu corresponding to the upper bits of the result of multiplication between the plaintexts a and b and the ciphertext $c_L$ corresponding to the lower bits are obtained.

Since the result obtained by referring to each LUT is only the right half plane of the circle group as described above, the plaintexts of both the TLWE ciphertext cu and the TLWE ciphertext $c_L$ as the differences are not out of the entire plane of the circle group, so that it is confirmed that information missing does not occur.

The TLWE ciphertext $c_L$ may become negative in some cases. For example, when a=1, b=6, and t=8, such results are obtained that the plaintext integer of the TLWE ciphertext cu is 1, and the plaintext integer of the TLWE ciphertext $c_L$ is −2. While 1×6=6 has to be established, calculation t×1−2=6 is performed, and it can be said that calculation itself is performed correctly.

However, as compared with a case where, when a=3, b=2, and t=8, the plaintext integer of the TLWE ciphertext cu is 0, the plaintext integer of the TLWE ciphertext $c_L$ is 6, and therefore t×0+6=6, two or more types of representation are obtained in order to represent the result of 6 that is the same multiplication result.

There may be no problem for some types of subsequent calculation. However, for some applications, it is necessary to perform normalization additionally.

Normalization is a process of making a calculation result be obtained by always the same representation for the result of 6 in the above description.

In a case where normalization is necessary, the following processes are added. First, in order to determine whether the TLWE ciphertext $c_L$ is negative or non-negative, that is, the plaintext thereof is present on the right half plane of the circle group $\{T\}$ or on the left half plane of the circle group $\{T\}$, the TLWE ciphertext $c_L$ is subjected to Bootstrapping using a flat test vector polynomial in which all coefficients are 1/(4t), whereby a TLWE ciphertext cs is obtained.

The TLWE ciphertext cs has −1/(4t) as a plaintext when the plaintext of the TLWE ciphertext $c_L$ is present on the left half plane of the circle group {T} and has 1/(4t) as a plaintext when the plaintext is present on the right half plane.

The following calculation is performed:

$$TLWE \text{ ciphertext } cs' = cs - (0, 1/4t); \text{ and}$$

$$TLWE \text{ ciphertext } cs'' = t \times cs - (0, 1/4).$$

Since the TLWE ciphertext cs' is −1 (only when the plaintext of the TLWE ciphertext $c_L$ is negative) or 0 as an integer symbol, the encryption processing apparatus 1 adds the TLWE ciphertext cs' to the TLWE ciphertext cu in a homomorphic manner.

Since the TLWE ciphertext cs'' has −½ as a plaintext when the plaintext of the TLWE ciphertext $c_L$ is negative and has 0 otherwise, the encryption processing apparatus 1 adds (or subtracts) the TLWE ciphertext cs'' to (or from) the TLWE ciphertext $c_L$ in a homomorphic manner.

When the plaintext of the TLWE ciphertext cu is 1 and the plaintext of the TLWE ciphertext $c_L$ is −2, the plaintext of the TLWE ciphertext cs is −1/(4t), and the new TLWE ciphertext cu having 0 as a plaintext and the new TLWE ciphertext $c_L$ having 6 as a plaintext are obtained.

Third Example

In the first and second examples, the coefficients in the TLWE ciphertexts ca and cb are divided by 2, and thereafter addition and subtraction between the TLWE ciphertexts ca' and cb' are performed.

The order of operations is not limited thereto. Addition and subtraction between the TLWE ciphertexts ca and cb may be performed prior to division by 2.

In this case, the encryption processing apparatus 1 performs homomorphic addition between the TLWE ciphertext ca and the TLWE ciphertext cb (ca+cb) to obtain a new ciphertext. The encryption processing apparatus 1 further performs homomorphic subtraction between the TLWE ciphertext ca and the TLWE ciphertext cb (ca-cb) to obtain a new ciphertext.

The encryption processing apparatus 1 divides the coefficients by 2 of the ciphertext of the result of homomorphic addition described above to obtain the TLWE ciphertext cc1. The encryption processing apparatus 1 further divides the coefficients by 2 of the ciphertext of the result of homomorphic subtraction to obtain the TLWE ciphertext cc2.

The subsequent processes using the TLWE ciphertexts cc1 and cc2 are the same as those in FIGS. 2A to 2C and 10A to 10C.

However, it is necessary to prevent information missing because elements of each of LWE ciphertexts of the sum and the difference between the TLWE ciphertext ca and the TLWE ciphertext cb are no longer elements of the circle group.

For example, multiplication is performed between the TLWE ciphertext ca having 0.6 on the circle group as a plaintext and the TLWE ciphertext cb having 0.8 on the circle group as a plaintext. In order to perform this multiplication, it is assumed that the sum of the TLWE ciphertext ca and the TLWE ciphertext cb is obtained, similarly to the first and second examples.

At this time, when the sum between the plaintexts is calculated as represented by 0.6+0.8, it is correct that the sum is 1.4, that is, 0.4 as an operation on the circle group. However, when the sum is divided by 2, it is necessary to divide 1.4 by 2. This is because, when 0.4 is divided by 2, the result is 0.2, that is, a correct value is not obtained.

Therefore, in a case where the circle group is represented by fixed-point representation in which the integer part is represented by 0 bit and the decimal part is represented by 32 bits, the sum and the difference have to be represented by 1 bit for the integer part and 32 bits for the decimal part.

However, this representation is disadvantageous in implementation on a CPU in which the bit width of a variable is fixed.

The integer part and the decimal part may be represented by 1 bit and 31 bits, respectively, while the least significant bit is allowed to contain an error. In this case, when the fixed-point representation including 1 bit for the integer part and 31 bits for the decimal part obtained as the sum or the difference is read as fixed-point representation including 0 bit for the integer part and 32 bits for the decimal part with the order of bits unchanged, the read form is equivalent to the form when division of the sum (addition) or the difference (subtraction) by 2 is performed.

FIG. 11 is a flowchart for explaining a multiplication process according to the first example of the present embodiment.

The encryption processing apparatus 1 (the sixth operation unit 41) divides coefficients in the TLWE ciphertext ca by 2 to obtain the TLWE ciphertext ca' at Step S101.

The encryption processing apparatus 1 (the seventh operation unit 42) divides coefficients in the TLWE ciphertext cb by 2 to obtain the new TLWE ciphertext cb' at Step S102.

The processes at Steps S101 and S102 can be performed in any order.

At Step S103, the encryption processing apparatus 1 (the first operation unit 12) performs homomorphic addition between the TLWE ciphertext ca' and the TLWE ciphertext cb' to obtain the new TLWE ciphertext cc1.

At Step S104, the encryption processing apparatus 1 (the second operation unit 13) subtracts the TLWE ciphertext cb' from the TLWE ciphertext ca' in a homomorphic manner to obtain the new TLWE ciphertext cc2.

The processes at Steps S103 and S104 can be performed in any order.

In relation to the third example, the processes corresponding to Steps S101 and S102 may be performed after the processes corresponding to Steps S103 and S104.

That is, the TLWE ciphertext cc1 may be obtained by performing homomorphic addition between the TLWE ciphertext ca and the TLWE ciphertext cb and then dividing coefficients in a ciphertext as the result of that homomorphic addition by 2.

The TLWE ciphertext cc2 may be obtained by subtracting the TLWE ciphertext cb from the TLWE ciphertext ca in a homomorphic manner and then dividing coefficients in a ciphertext as the result of that homomorphic subtraction by 2.

At Step S105, the encryption processing apparatus 1 (the first Bootstrapping unit 17) performs the first Bootstrapping using the flat first test vector polynomial T1(X) in which all coefficients are ¼ for the TLWE ciphertext cc1 to obtain the new TLWE ciphertext cd.

At Step S106, the encryption processing apparatus 1 (the third operation unit 14) performs homomorphic addition between the TLWE ciphertext cc1 and the TLWE ciphertext cd to obtain the new TLWE ciphertext cc1'.

At Step S107, the encryption processing apparatus 1 (the fourth operation unit 15) performs homomorphic addition between the TLWE ciphertext cc2 and the TLWE ciphertext cd to obtain the new TLWE ciphertext cc2'.

The processes at Steps S106 and S107 can be performed in any order.

At Step S108, the encryption processing apparatus 1 (the second Bootstrapping unit 18) performs the second Bootstrapping using the second test vector polynomial $T_p(X)$ for the TLWE ciphertext cc1' to obtain the new TLWE ciphertext cf1.

At Step S109, the encryption processing apparatus 1 (the third Bootstrapping unit 19) performs the third Bootstrapping using the third test vector polynomial $T_m(X)$ for the TLWE ciphertext cc2' to obtain the new TLWE ciphertext cf2.

The processes at Steps S108 and S109 can be performed in any order.

At Step S110, the encryption processing apparatus 1 (the fifth operation unit 16) subtracts the TLWE ciphertext cf2 from the TLWE ciphertext cf1 in a homomorphic manner to obtain the new TLWE ciphertext cg corresponding to the multiplication result. This TLWE ciphertext cg includes all upper and lower bits.

With the above processes, the result of multiplication between Integer-wise type TLWE ciphertexts can be obtained.

FIG. 12 is a flowchart for explaining a multiplication process according to the second example of the present embodiment.

Steps S201 to S207 are the same as Steps S101 to S107 in FIG. 11.

In relation to the third example, the processes corresponding to Steps S201 and S202 may be performed after the processes corresponding to Steps S203 and S204.

That is, the TLWE ciphertext cc1 may be obtained by performing homomorphic addition between the TLWE ciphertext ca and the TLWE ciphertext cb and then dividing coefficients in a ciphertext as the result of that homomorphic addition by 2.

The TLWE ciphertext cc2 may be obtained by subtracting the TLWE ciphertext cb from the TLWE ciphertext ca in a homomorphic manner and then dividing coefficients in a ciphertext as the result of that homomorphic subtraction by 2.

At Step S208, the encryption processing apparatus 1 (the fourth Bootstrapping unit 51) performs the fourth Bootstrapping using the fourth test vector polynomial $T_{p1}(X)$ for the TLWE ciphertext cc1' to obtain the new TLWE ciphertexts $c_{PU}$ and $c_{PL}$.

At Step S209, the encryption processing apparatus 1 (the fifth Bootstrapping unit 52) performs the fifth Bootstrapping using the fifth test vector polynomial $T_m(X)$ for the TLWE ciphertext cc2' to obtain the new TLWE ciphertexts $c_{MU}$ and $c_{ML}$.

The processes at Steps S208 and S209 can be performed in any order.

At Step S210, the encryption processing apparatus 1 (the eighth operation unit 43) subtracts the TLWE ciphertext $c_{MU}$ from the TLWE ciphertext $c_{PU}$ in a homomorphic manner to obtain the new TLWE ciphertext cu. The TLWE ciphertext cu is a ciphertext corresponding to the upper bits of the multiplication result.

At Step S211, the encryption processing apparatus 1 (the ninth operation unit 44) subtracts the TLWE ciphertext $c_{ML}$ from the TLWE ciphertext $c_{PL}$ in a homomorphic manner to obtain the new TLWE ciphertext $c_L$. The TLWE ciphertext $c_L$ is a ciphertext corresponding to the lower bits of the multiplication result.

With the above processes, the upper and lower bits of the result of multiplication between Integer-wise type TLWE ciphertexts can be obtained.

Fourth Example

In the first example, as illustrated in FIG. 2A, the TLWE ciphertext cc1' and the TLWE ciphertext cc2' are obtained by obtaining the TLWE ciphertext ca' and the TLWE ciphertext cb' by division of the coefficients in the TLWE ciphertext ca and the TLWE ciphertext cb by 2, respectively, and performing homomorphic addition and homomorphic subtraction between the TLWE ciphertext ca' and the TLWE ciphertext cb'.

However, the operation order is not limited thereto. The TLWE ciphertext cc2' can be obtained by obtaining the TLWE ciphertext cc1' in the same procedure as that in the case of FIG. 2A and then subtracting the TLWE ciphertext cb from the TLWE ciphertext cc1' in a homomorphic manner.

Since the plaintext of the TLWE ciphertext cc1' is (a+b)/(4t)+1/(8t) and the plaintext of the TLWE ciphertext cc2' is (a−b)/(4t)+1/(8t), $$(a+b)/(4t)+1/(8t)-\{(a-b)/(4t)+1/(8t)\} =$$
$$a/(4t)+b/(4t)+1/(8t)-\{a/(4t)-b/(4t)+1/(8t)\} =$$
$$a/(4t)+b/(4t)+1/(8t)-a/(4t)+b/(4t)-1/(8t) = 2b/(4t) = b/(2t).$$

From the above calculation, TLWE ciphertext cc1'−TLWE ciphertext cc2'=TLWE ciphertext cb is established when an offset difference is ignored.

Therefore, the TLWE ciphertext cc2' can be obtained from TLWE ciphertext cc1'−TLWE ciphertext cb.

Specifically, the encryption processing apparatus 1 performs a homomorphic operation that calculates cc1'−cb+(0, 1/(4t)), thereby obtaining the TLWE ciphertext cc2'.

In this case, it is unnecessary to perform the second homomorphic operation of subtracting the TLWE ciphertext cb' from the TLWE ciphertext ca' in a homomorphic manner by the second operation unit 13 in FIG. 2A. Consequently, the fourth homomorphic operation of adding the TLWE ciphertext cc2 and the TLWE ciphertext cd together in a homomorphic manner by the fourth operation unit 15, is not performed.

Details are described below.

As described above, the plaintext of the TLWE ciphertext cc1' has been (a+b)/(4t)+1/(8t), and the plaintext of the TLWE ciphertext cb has been b/(2t)+1/(4t).

Therefore, the plaintext of cc1'−cb+(0, 1/(4t)) is (a−b)/(4t)+1/(8t) from the following calculation.

$$(a+b)/(4t)+1/(8t)-\{b/(2t)+1/(4t)\}+1/(4t) =$$
$$a/(4t)+b/(4t)+1/(8t)-\{b/(2t)+1/(4t)\}+1/(4t) =$$
$$a/(4t)+b/(4t)+1/(8t)-2b/(4t)-1/(4t)+1/(4t) =$$
$$a/(4t)+b/(4t)-2b/(4t)-1/(4t)+1/(4t)+1/(8t) =$$
$$a/(4t)-b/(4t)+1/(8t) = (a-b)/(4t)+1/(8t).$$

Further, the plaintext of the TLWE ciphertext cc2' described in the first example has been (a–b)/(4t)+1/(8t).

From the above discussion, it is found that cc1'–cb+(0, 1/(4t)) provides a ciphertext having the same plaintext as the TLWE ciphertext cc2'.

Further, from $$\{(a+b)/(4t)+1/(8t)\} + \{(a-b)/(4t)+1/(8t)\} =$$

$$a/(4t)+b/(4t)+1/(8t)+a/(4t)-b/(4t)+1/(8t) =$$

$$2a/(4t)+2/(8t) = a/(2t)+1/(4t),$$

TLWE ciphertext cc1'+TLWE ciphertext cc2'=TLWE ciphertext ca is established when the offset difference is ignored.

Therefore, the TLWE ciphertext cc2' can be obtained by subtracting the TLWE ciphertext ca from the TLWE ciphertext cc1' in a homomorphic manner.

Specifically, the encryption processing apparatus 1 performs a homomorphic operation that calculates cc1'–ca+(0, 1/(4t)), thereby obtaining the TLWE ciphertext cc2'.

As described above, the plaintext of the TLWE ciphertext cc1' has been (a+b)/(4t)+1/(8t), and the plaintext of the TLWE ciphertext ca has been a/(2t)+1/(4t).

Therefore, the plaintext of cc1'–ca+(0, 1/(4t)) is (–a+b)/(4t)+1/(8t) from the following calculation.

$$(a+b)/(4t)+1/(8t) - \{a/(2t)+1/(4t)\} + 1/(4t) =$$

$$a/(4t)+b/(4t)+1/(8t) - \{a/(2t)+1/(4t)\} + 1/(4t) =$$

$$a/(4t)+b/(4t)+1/(8t) - 2a/(4t) - 1/(4t) + 1/(4t) =$$

$$a/(4t)+b/(4t) - 2a/(4t) - 1/(4t) + 1/(4t) + 1/(8t) =$$

$$-a/(4t)+b/(4t)+1/(8t) = (-a+b)/(4t)+1/(8t).$$

Further, the plaintext of the TLWE ciphertext cc2' described in the first example has been (a–b)/(4t)+1/(8t). From the above discussion, a TLWE ciphertext cc2" is obtained in which the sign of the integer symbol corresponding to the plaintext is reversed from that of the TLWE ciphertext cc2' by cc1'–ca+(0, 1/(4t)). Handling of the TLWE ciphertext cc2" will be described later.

Alternatively, the TLWE ciphertext cc2' can be obtained by subtracting the TLWE ciphertext cc1' from the TLWE ciphertext ca in a homomorphic manner (ca–cc1') without obtaining the TLWE ciphertext cc2". In this case, it is not necessary to add the offset such as (0, 1/(4t)) to ca–cc1'.

Figure 13:
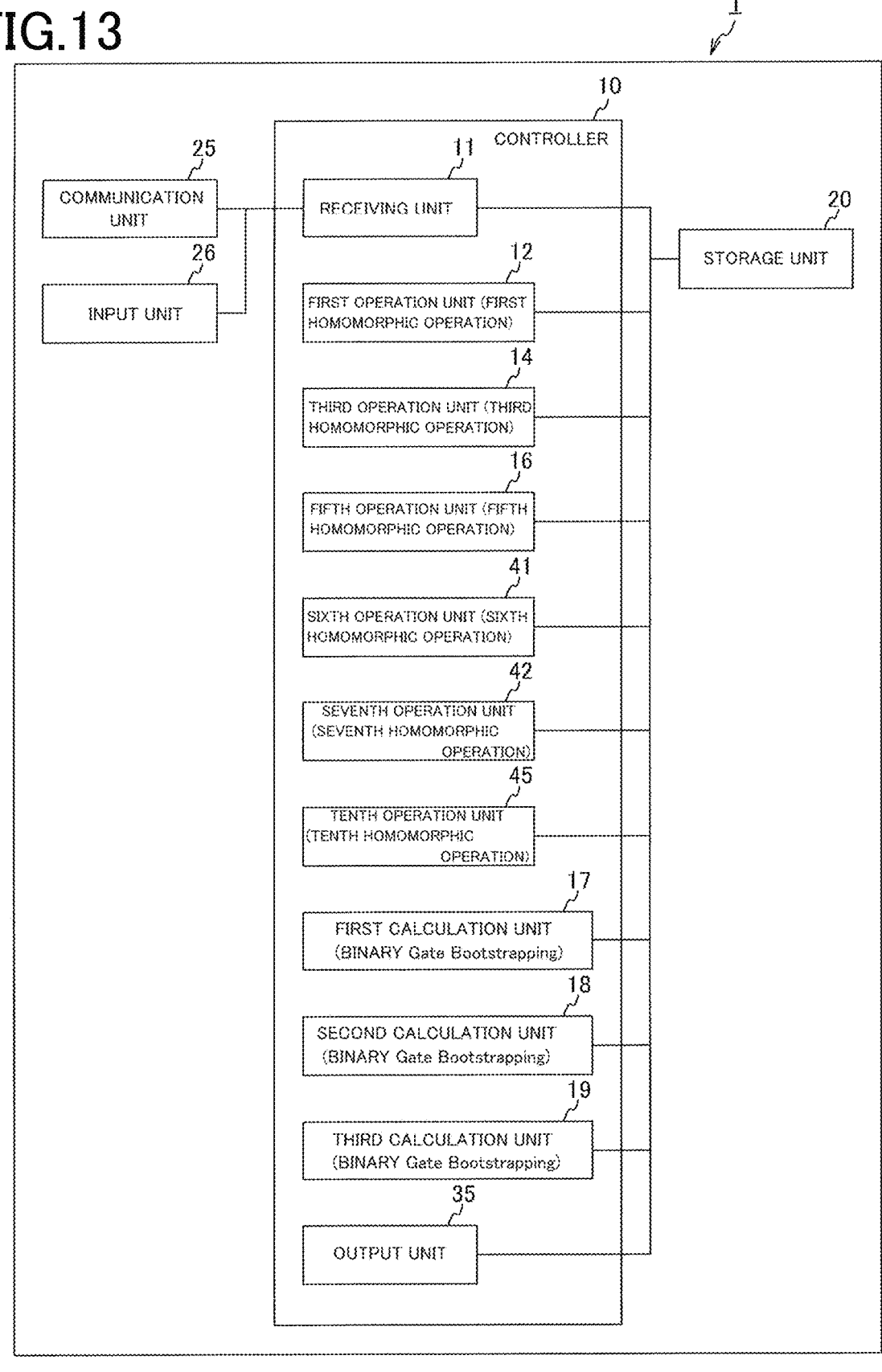
FIG. 13 is an explanatory diagram of a functional configuration of an encryption processing apparatus according to the fourth example of the present embodiment.

FIG. 13 is an explanatory diagram of a functional configuration of an encryption processing apparatus according to the fourth example of the present embodiment.

Figure 14:
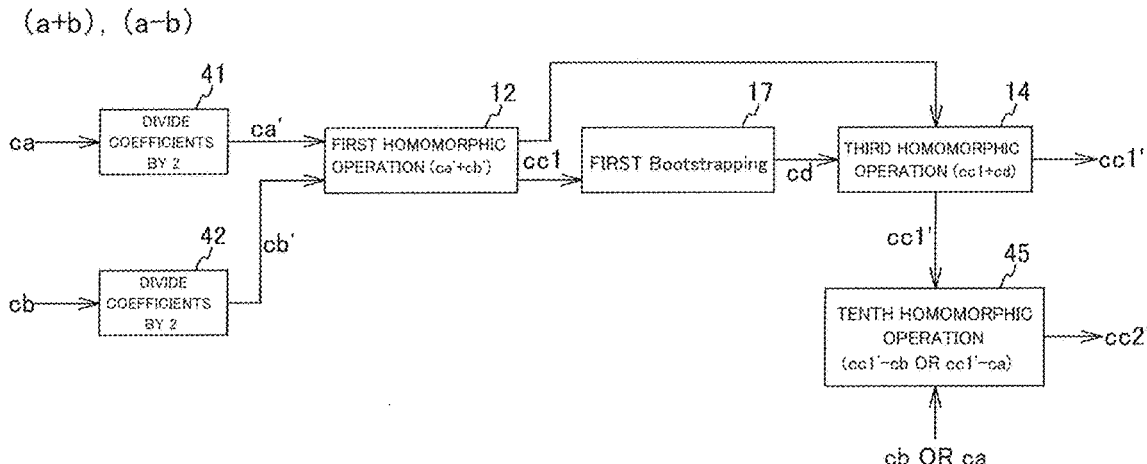
FIG. 14 is an explanatory diagram of operation processes based on the functional configuration in FIG. 13.

FIG. 14 is an explanatory diagram of operation processes based on the functional configuration in FIG. 13.

The fourth example illustrated in FIGS. 13 and 14 is different from the first example illustrated in FIGS. 1 and 2A to 2C in not including the second operation unit 13 and the fourth operation unit 15 but including a tenth operation unit 45.

In the fourth example, ciphertexts respectively corresponding to the sum (a+b) of the plaintext a and the plaintext b and the difference (a–b) are obtained as illustrated in FIG. 14.

In FIG. 14, the encryption processing apparatus 1 inputs the TLWE ciphertext ca to the sixth operation unit 41 to obtain the new TLWE ciphertext ca' that is obtained by dividing coefficients in the TLWE ciphertext ca by 2.

The encryption processing apparatus 1 also inputs the TLWE ciphertext cb to the seventh operation unit 42 to obtain the new TLWE ciphertext cb' that is obtained by dividing coefficients in the TLWE ciphertext cb by 2.

The encryption processing apparatus 1 inputs the TLWE ciphertext ca' and the TLWE ciphertext cb' to the first operation unit 12 and performs homomorphic addition between the TLWE ciphertext ca' and the TLWE ciphertext cb' (the first homomorphic operation), thereby obtaining the new TLWE ciphertext cc1.

The encryption processing apparatus 1 inputs the TLWE ciphertext cc1 to the first Bootstrapping unit 17 and performs Gate Bootstrapping for the TLWE ciphertext cc1 by using the flat test vector polynomial T1(X) in which all coefficients are ¼, thereby obtaining the new TLWE ciphertext cd.

The encryption processing apparatus 1 inputs the TLWE ciphertext cc1 and the TLWE ciphertext cd to the third operation unit 14 and performs homomorphic addition between the TLWE ciphertext cc1 and the TLWE ciphertext cd (the third homomorphic operation), thereby obtaining the new TLWE ciphertext cc1'.

The first test vector polynomial may be configured to make the TLWE ciphertext cd have –¼ as a plaintext when the plaintext is present on the right half plane and ¼ as a plaintext when the plaintext is present on the left half plane, and the TLWE ciphertext cc1' may be obtained by subtracting the TLWE ciphertext cd from the TLWE ciphertext cc1 in a homomorphic manner.

The encryption processing apparatus 1 inputs the TLWE ciphertext cc1' and the TLWE ciphertext cb to the tenth operation unit 45 and performs homomorphic subtraction between the TLWE ciphertext cc1' and the TLWE ciphertext cb (the tenth homomorphic operation), thereby obtaining the new TLWE ciphertext cc2'.

The tenth homomorphic operation is a homomorphic operation of calculating cc1'–cb+(0, 1/(4t)) described above.

Alternatively, the encryption processing apparatus 1 inputs the TLWE ciphertext cc1' and the TLWE ciphertext ca to the tenth operation unit 45 and performs homomorphic subtraction between the TLWE ciphertext cc1' and the TLWE ciphertext ca as the tenth homomorphic operation, thereby obtaining the new TLWE ciphertext cc2'. In this case, the tenth homomorphic operation is a homomorphic operation of calculating cc1'–ca+(0, 1/(4t)) described above.

The processes after the TLWE ciphertext cc1' and the TLWE ciphertext cc2' are obtained are the same as those in FIGS. 2A to 2C.

Fifth Example

In the fourth example, the TLWE ciphertext cc2' is obtained by obtaining the TLWE ciphertext cc1' and performing homomorphic subtraction of the TLWE ciphertext cb or the TLWE ciphertext ca from the obtained TLWE ciphertext cc1'.

Meanwhile, the TLWE ciphertext cc1' can be obtained by obtaining the TLWE ciphertext cc2' in the same procedure as that in the case of FIG. 2A and then performing homomorphic addition of the TLWE ciphertext cb to the TLWE ciphertext cc2'. This calculation is based on the fact that TLWE ciphertext cc1'–TLWE ciphertext cc2'=TLWE ciphertext cb is established, as described in the fourth example. The TLWE ciphertext cc1' can be obtained from TLWE ciphertext cc2'+TLWE ciphertext cb.

Specifically, the encryption processing apparatus 1 performs a homomorphic operation that calculates cc2'+cb−(0, 1/(4t)), thereby obtaining the TLWE ciphertext cc1'.

As described above, the plaintext of the TLWE ciphertext cc2' has been (a−b)/(4t)+1/(8t), and the plaintext of the TLWE ciphertext cb has been b/(2t)+1/(4t).

Therefore, the plaintext of cc2'+cb−(0, 1/(4t)) is (a+b)/(4t)+1/(8t) from the following calculation.

$$(a-b)/(4t)+1/(8t)+\{b/(2t)+1/(4t)\}-1/(4t)=$$
$$a/(4t)-b/(4t)+1/(8t)+\{b/(2t)+1/(4t)\}-1/(4t)=a/(4t)-$$
$$b/(4t)+1/(8t)+2b/(4t)+1/(4t)-1/(4t)=a/(4t)+b/(4t)+1/(8t)$$

The plaintext of the TLWE ciphertext cc1' described in the first example has been (a+b)/(4t)+1/(8t).

From the above discussion, it is found that cc2'+cb−(0, 1/(4t)) provides a ciphertext having the same plaintext as the TLWE ciphertext cc1'.

Further, the TLWE ciphertext cc1' can be obtained by subtracting the TLWE ciphertext ca from the TLWE ciphertext cc2' in a homomorphic manner.

This calculation is based on the fact that TLWE ciphertext cc1'+TLWE ciphertext cc2'=TLWE ciphertext ca is established, as described in the fourth example. The TLWE ciphertext cc1' can be obtained from TLWE ciphertext cc2'−TLWE ciphertext ca.

Specifically, the encryption processing apparatus 1 performs a homomorphic operation that calculates cc2'−ca+(0, 1/(4t)), thereby obtaining the TLWE ciphertext cc1'.

As described above, the plaintext of the TLWE ciphertext cc2' has been (a−b)/(4t)+1/(8t), and the plaintext of the TLWE ciphertext ca has been a/(2t)+1/(4t).

Therefore, the plaintext of cc2'−ca+(0, 1/(4t)) is (−a+b)/(4t)+1/(8t) from the following calculation.

$$(a+b)/(4t)+1/(8t)-\{a/(2t)+1/(4t)\}+1/(4t)=$$
$$a/(4t)+b/(4t)+1/(8t)-\{a/(2t)+1/(4t)\}+1/(4t)=$$
$$a/(4t)+b/(4t)+1/(8t)-2a/(4t)-1/(4t)+1/(4t)=$$
$$a/(4t)+b/(4t)-2a/(4t)-1/(4t)+1/(4t)+1/(8t)=$$
$$-a/(4t)+b/(4t)+1/(8t)=(-a+b)/(4t)+1/(8t).$$

The plaintext of the TLWE ciphertext cc2' has been (a−b)/(4t)+1/(8t). From the above discussion, the TLWE ciphertext cc1" is obtained in which the sign of the integer symbol corresponding to the plaintext is reversed by cc2'−ca+(0, 1/(4t)). Handling of the TLWE ciphertext cc1" will be described later.

Alternatively, the TLWE ciphertext cc1' can be obtained by subtracting the TLWE ciphertext cc2' from the TLWE ciphertext ca in a homomorphic manner (ca−cc2'), without obtaining the TLWE ciphertext cc1". In this case, it is not necessary to add the offset such as (0, 1/(4t)) to ca−cc2'.

Figure 15:
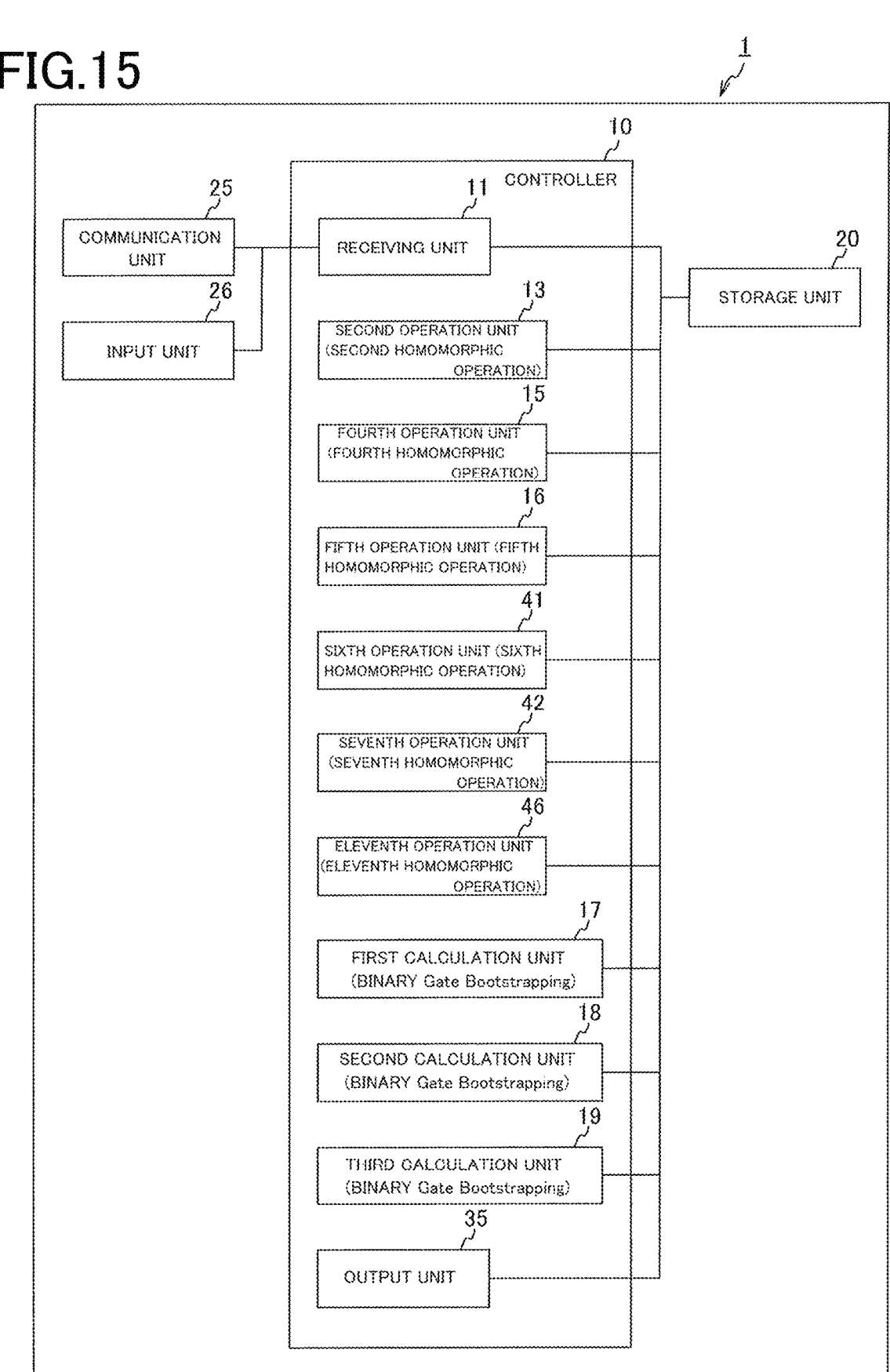
FIG. 15 is an explanatory diagram of a functional configuration of an encryption processing apparatus according to the fifth example of the present embodiment.

FIG. 15 is an explanatory diagram of a functional configuration of an encryption processing apparatus according to the fifth example of the present embodiment.

Figure 16:
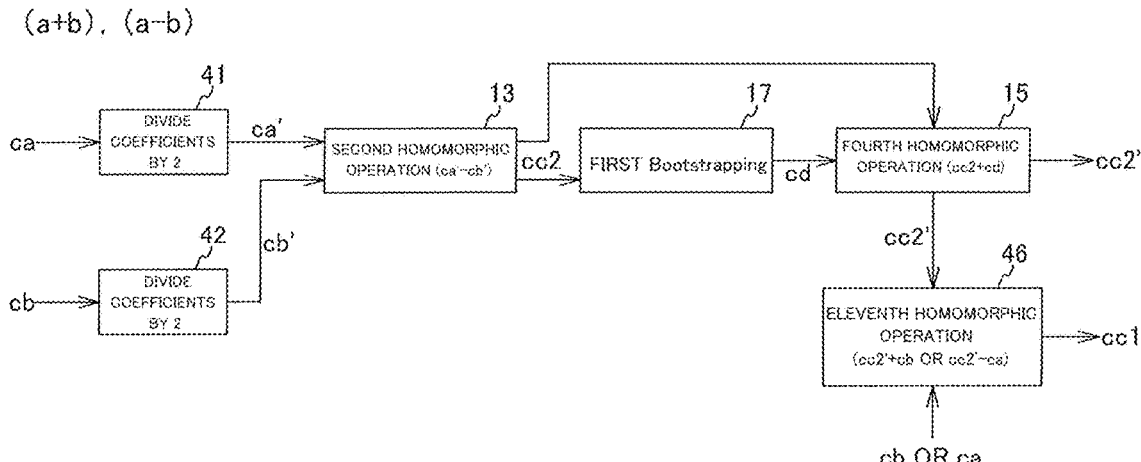
FIG. 16 is an explanatory diagram of operation processes based on the functional configuration in FIG. 15, FIGS. 17A and 17B are diagrams illustrating ciphertexts input to and output from Gate Bootstrapping in the present embodiment.

FIG. 16 is an explanatory diagram of operation processes based on the functional configuration in FIG. 15.

The fifth example illustrated in FIGS. 15 and 16 is different from the fourth example illustrated in FIGS. 13 and 14 in not including the first operation unit 12, the third operation unit 14, and the tenth operation unit 45 but including the second operation unit 13, the fourth operation unit 15, and an eleventh operation unit 46.

In the fifth example, ciphertexts respectively corresponding to the sum (a+b) of the plaintext a and the plaintext b and the difference (a−b) are obtained as illustrated in FIG. 16.

In FIG. 16, the encryption processing apparatus 1 inputs the TLWE ciphertext ca to the sixth operation unit 41 to obtain the new TLWE ciphertext ca' that is obtained by dividing coefficients in the TLWE ciphertext ca by 2.

The encryption processing apparatus 1 also inputs the TLWE ciphertext cb to the seventh operation unit 42 to obtain the new TLWE ciphertext cb' that is obtained by dividing coefficients in the TLWE ciphertext cb by 2.

The encryption processing apparatus 1 inputs the TLWE ciphertext ca' and the TLWE ciphertext cb' to the second operation unit 13 and performs homomorphic subtraction between the TLWE ciphertext ca' and the TLWE ciphertext cb' (the second homomorphic operation), thereby obtaining the new TLWE ciphertext cc2.

The encryption processing apparatus 1 inputs the TLWE ciphertext cc2 to the first Bootstrapping unit 17 and performs Gate Bootstrapping for the TLWE ciphertext cc2 by using the flat test vector polynomial T1(X) in which all coefficients are ¼, thereby obtaining the new TLWE ciphertext cd.

The encryption processing apparatus 1 inputs the TLWE ciphertext cc2 and the TLWE ciphertext cd to the fourth operation unit 15 and performs homomorphic addition between the TLWE ciphertext cc2 and the TLWE ciphertext cd (the fourth homomorphic operation), thereby obtaining the new TLWE ciphertext cc2'.

The first test vector polynomial may be configured to make the TLWE ciphertext cd have −¼ as a plaintext when the plaintext is present on the right half plane and ¼ as a plaintext when the plaintext is present on the left half plane, and the TLWE ciphertext cc2' may be obtained by subtracting the TLWE ciphertext cd from the TLWE ciphertext cc2 in a homomorphic manner.

The encryption processing apparatus 1 inputs the TLWE ciphertext cc2' and the TLWE ciphertext cb to the eleventh operation unit 46 and performs homomorphic addition between the TLWE ciphertext cc2' and the TLWE ciphertext cb (the eleventh homomorphic operation), thereby obtaining the new TLWE ciphertext cc1'.

The eleventh homomorphic operation is a homomorphic operation of calculating cc2'+cb−(0, 1/(4t)) described above.

Alternatively, the encryption processing apparatus 1 inputs the TLWE ciphertext cc2' and the TLWE ciphertext ca to the tenth operation unit 45 and performs homomorphic subtraction between the TLWE ciphertext cc2' and the TLWE ciphertext ca as the eleventh homomorphic operation, thereby obtaining the new TLWE ciphertext cc1'. In this case, the eleventh homomorphic operation is a homomorphic operation of calculating cc2'−ca+(0, 1/(4t)) described above.

The processes after the TLWE ciphertexts cc1' and cc2' are obtained are the same as those in FIGS. 2A to 2C and 10A to 10C.

Further, also in the second example described with reference to FIGS. 9 and 10A to 10C, the TLWE ciphertext cc1' and the TLWE ciphertext cc2' can be obtained by performing the methods in the fourth and fifth examples in the process in FIG. 10A that obtains the ciphertexts respectively corresponding to the sum (a+b) and the difference (a−b) of the plaintext a and the plaintext b.

In this case, the encryption processing apparatus 1 has a functional configuration including the eighth operation unit 43, the ninth operation unit 44, the fourth calculation unit 51, and the fifth calculation unit 52 in FIG. 9 in place of the second calculation unit 18 and the third calculation unit 19 in FIG. 13.

Further, in the third example, in order to obtain the TLWE ciphertexts cc1 and cc2 in the first and second examples, homomorphic addition and homomorphic subtraction between the TLWE ciphertext ca and the TLWE ciphertext cb are performed, and coefficients in the obtained ciphertexts are divided by 2.

Also in the fourth example, in order to obtain the TLWE ciphertext cc1, homomorphic addition between the TLWE ciphertext ca and the TLWE ciphertext cb may be performed, and the coefficient in the obtained ciphertext may be divided by 2.

In this case, the encryption processing apparatus 1 performs homomorphic addition between the TLWE ciphertext ca and the TLWE ciphertext cb to obtain a new TLWE ciphertext and then divides the coefficients in the obtained ciphertext by 2 to obtain the TLWE ciphertext cc1. The subsequent processes using the TLWE ciphertexts cc1 and cc2 are the same as those in FIGS. 2A to 2C and 10A to 10C.

Also in the fifth example, in order to obtain the TLWE ciphertext cc2, homomorphic subtraction between the TLWE ciphertext ca and the TLWE ciphertext cb may be performed, and the coefficients in the obtained ciphertext may be divided by 2.

In this case, the encryption processing apparatus 1 performs homomorphic subtraction between the TLWE ciphertext ca and the TLWE ciphertext cb to obtain a new TLWE ciphertext and then divides the coefficients in the obtained ciphertext by 2 to obtain the new TLWE ciphertext cc2. The subsequent processes using the TLWE ciphertexts cc1 and cc2 are the same as those in FIGS. 2A to 2C and 10A to 10C.

As described above, the signs of the TLWE ciphertext cc2" obtained in the fourth example and the TLWE ciphertext cc1" obtained in the fifth example are reversed from those of the TLWE ciphertext cc2' and the TLWE ciphertext cc1' as an integer symbol, respectively.

The operations performed using the TLWE ciphertext cc1' and the TLWE ciphertext cc2' in FIGS. 2B and 10B are operations of obtaining the square, and $x^2=(-x)^2$. Therefore, the TLWE ciphertext cc2" and the TLWE ciphertext cc1" can be used as they are theoretically. However, for example, the square of the TLWE ciphertext cc2" is out of the range of a LUT for obtaining the square of the TLWE ciphertext cc1' in the fifth example. Therefore, it is necessary to change the test vector polynomial $T_p(X)$ used in BlindRotate of the second Bootstrapping in the first example or the test vector polynomial Tp1(X) used in BlindRotate of the fourth Bootstrapping in the second example.

Therefore, it is desirable to reverse again the sign of the TLWE ciphertext cc2" obtained in the fourth example and the sign of the TLWE ciphertext cc1" obtained in the fifth example before calculation of the square in FIGS. 2B and 10B.

The following description is provided as to the method of reversing again the sign of the TLWE ciphertext cc2" and the sign of the TLWE ciphertext cc1" to obtain the TLWE ciphertext cc2' and the TLWE ciphertext cc1'.

Because of the effect of the offset, the signs of the TLWE ciphertext cc2" and the TLWE ciphertext cc1" are not completely reversed on the circle group even if the signs are reversed from those of the TLWE ciphertext cc2' and the TLWE ciphertext cc1' as an integer symbol.

Therefore, (0, 1/(8t)) that is the offset is subtracted from the TLWE ciphertext cc2" and the TLWE ciphertext cc1" so as to be removed first, the signs of all coefficients in the ciphertext are reversed, and thereafter (0, 1/(8t)) is added. The offset is then added.

As a result, the TLWE ciphertext cc2' and the TLWE ciphertext cc1' are obtained which have the signs reversed from the signs of integer symbols of the TLWE ciphertext cc2" and the TLWE ciphertext cc1".

Accordingly, it is possible to perform Bootstrapping using the test vector polynomial $T_p(X)$ and the test vector polynomial Tp1(X) that are the same as those in FIGS. 2B and 10B and to obtain the square of the TLWE ciphertext cc2' and the square of the TLWE ciphertext cc1'.

Calculation of obtaining the TLWE ciphertext cc2' and the TLWE ciphertext cc1' from the TLWE ciphertext cc2" and the TLWE ciphertext cc1" is represented as follows.

It is assumed that each of the TLWE ciphertext cc2" and the TLWE ciphertext cc1" is a TLWE ciphertext ct. It is assumed that each of the TLWE ciphertext cc2' and the TLWE ciphertext cc1' that are to be obtained is a TLWE ciphertext ct'.

First, c1=ct−(0, 1/(8t)) is performed, so that the offset in the TLWE ciphertext ct is removed.

The sign on the circle group of the TLWE ciphertext ct from which the offset has been removed is reversed by performing c2=−c1.

Subsequently, ct'=c2+(0, 1/(8t)) is performed, so that the offset is added again. The TLWE ciphertext ct' is obtained in this manner.

The operations described above are combined into ct'=−(ct−(0, 1/(8t))+(0, 1/(8t)).

This expression can be arranged as ct'=−ct+(0, 1/(4t)).

By setting −{cc1'−ca+(0, 1/(4t))}+(0, 1/(4t)) in the tenth homomorphic operation in the fourth example, it is possible to obtain the TLWE ciphertext cc2' without obtaining the TLWE ciphertext cc2".

That is, calculation can be performed as follows.

$$-\{cc1' - ca + (0, 1/(4t))\} + (0, 1/(4t)) = -cc1' + ca = -(0, 1/(4t))\} +$$
$$(0, 1/(4t)) = -cc1' + ca = -\{(a+b)/(4t) + 1/(8t)\} + a/(2t) + 1/(4t) =$$
$$-(a+b)/(4t) - 1/(8t) + a/(2t) + 1/(4t) =$$
$$-a/(4t) - b/(4t) - 1/(8t) + a/(2t) + 1/(4t) =$$
$$-a/(4t) + a/(2t) - b/(4t) - 1/(8t) + 1/(4t) = -a/(4t) + 2a/(4t) - b/(4t) -$$
$$1/(8t) + 2/(8t) = a/(4t) - b/(4t) + 1/(8t) = (a-b)/(4t) + 1/(8t).$$

The plaintext of the TLWE ciphertext cc2' is (a−b)/(4t)+1/(8t), and it is found that, by the above calculation, the TLWE ciphertext cc2' is obtained by reversing the sign of the TLWE ciphertext cc2".

By setting −{cc2'−ca+(0, 1/(4t))}+(0, 1/(4t)) in the eleventh homomorphic operation in the fifth example, it is possible to obtain the TLWE ciphertext cc1' without obtaining the TLWE ciphertext cc1".

That is, calculation can be performed as follows.

$$-\{cc2' - ca + (0, 1/(4t))\} + (0, 1/(4t)) = -cc2' + ca - (0, 1/(4t))\} +$$
$$(0, 1/(4t)) = -cc2' + ca = -\{(a-b)/(4t) + 1/(8t)\} + a/(2t) + 1/(4t) =$$
$$-(a-b)/(4t) - 1/(8t) + a/(2t) + 1/(4t) =$$

-continued $$-a/(4t) + b/(4t) - 1/(8t) + a/(2t) + 1/(4t) =$$

$$-a/(4t) + a/(2t) + b/(4t) - 1/(8t) + 1/(4t) = -a/(4t) + 2a/(4t) + b/(4t) -$$

$$1/(8t) + 2/(8t) = a/(4t) + b/(4t) + 1/(8t) = (a+b)/(4t) + 1/(8t).$$

The plaintext of the TLWE ciphertext cc1' is (a+b)/(4t)+ 1/(8t), and it is found that, by the above calculation, the TLWE ciphertext cc1' is obtained by reversing the sign of the TLWE ciphertext cc1".

As for both the TLWE ciphertext cc1' obtained in the fourth example and the TLWE ciphertext cc2' obtained in the fifth example, the sign can be reversed by using Expression ct'=−ct+(0, 1/(4t)) as represented by (b−a)/(4t)+1/(8t) and −(a+b)/(4t)+1/(8t), as necessary.

Multiplication is commutative, and a×b=b×a. Therefore, even if the plaintexts of the TLWE ciphertexts ca and cb are interchanged in the first to fifth examples described above, a ciphertext having the same plaintext is obtained as the multiplication result.

Figures 17A, 17B:
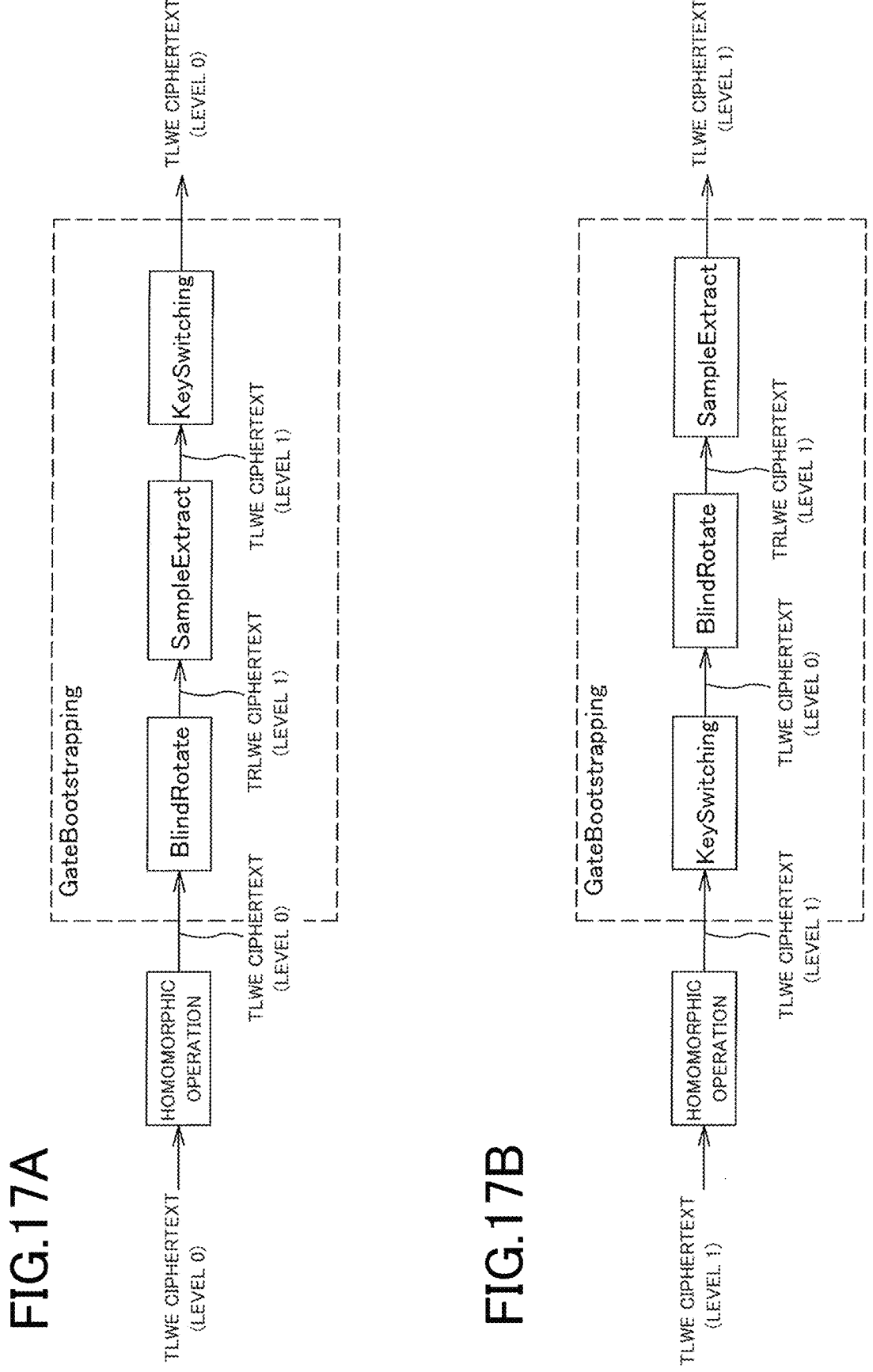

FIGS. 17A and 17B are diagrams illustrating ciphertexts input to and output from Gate Bootstrapping in the present embodiment.

In the above descriptions, as illustrated in FIG. 17A, Gate Bootstrapping, in particular, the first Bootstrapping has been described as being performed in the order of BlindRotate, SampleExtract, and Public Key Switching.

The order is not limited thereto. As illustrated in FIG. 17B, in Gate Bootstrapping, Public Key Switching can be performed first, and thereafter BlindRotate and SampleExtract can be performed.

As for TLWE ciphertexts, there is a concept of levels depending on the security strengths.

In Gate Bootstrapping in FIG. 17A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVELL. However, as a result of Public Key Switching, a LEVEL0 TLWE ciphertext is output.

Meanwhile, in the method illustrated in FIG. 17B, TLWE ciphertexts as input and output of the Gate Bootstrapping are set to LEVEL1, and Public Key Switching is performed first to lower the level to LEVEL0. In this state, BlindRotate is performed. When SampleExtract is then performed for a TRLWE ciphertext as the output of BlindRotate, a LEVEL1 TLWE ciphertext is output.

The LEVEL0 ciphertext is formed by an N-th order vector [a] of elements on the circle group {T} encrypted with an N-th order private key [s]. Meanwhile, the LEVEL1 ciphertext obtained as a result of SampleExtract is formed by an n-th order vector [a'] of elements on the circle group {T} encrypted with an n-th order private key [s'].

In the LEVEL0 ciphertext, the number of coefficients (the order of the vector) contributing to difficulty of the LWE problem is smaller than that in the LEVEL1 ciphertext, and thus the amount of calculation of homomorphic addition is smaller as compared with the LEVEL1 ciphertext.

On the other hand, the LEVEL0 ciphertext has a problem that the security strength tends to decrease when an allowable error added to a plaintext is made small. This is because in LWE encryption, the security is ensured by the error added to the plaintext.

In TLWE encryption, calculation (decipher) is more difficult as the error added to the plaintext is larger and the number of coefficients (the order of the vector) is larger.

In other words, regarding TLWE encryption, the smaller the error added to the plaintext is and the smaller the number of coefficients (the order of the vector) is, the easier calculation (decipher) is.

In particular, in TFHE applied to the Integer-wise type, it is necessary to divide the range from 0 to 1 of the circle group {T} more finely as the value of the plaintext (integer) stored in a TLWE ciphertext becomes larger. Therefore, errors needs to be made smaller also because of a problem of errors in decryption which will be described later. In this case, the security strength tends to decrease, as described above. Therefore, in order to make errors smaller, it is necessary to ensure the security by increasing the number of coefficients (the order of the vector) in the ciphertext.

In order to ensure the security of the ciphertext that is easy to calculate (decipher) by reducing any error added to the plaintext, it is desirable to move Public Key Switching to the beginning of Gate Bootstrapping and to use the LEVEL1 ciphertexts that have a larger number of coefficients (the order of the vector) and are easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by Public Key Switching as input.

Further, making any error to be added to a plaintext smaller has a problem of errors in decryption in addition to the above-described problem of the security strength.

As described above, in TFHE applied to Integer-wise type, the range from 0 to 1 associated with the circle group {T} is divided into 2t portions. When the value of t is made larger and the circle group is more finely divided, the upper limit of the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in normal distribution, and it is not possible to strictly set an "error range".

In principle, it is only possible to concentrate more errors in a specified range, although there is no change in the concentration around 0.

When the error is out of the set range, the corresponding plaintext is interpreted as a value in another divided region, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or an apparatus to which the present embodiment is applied.

Application Example

The processes performed by the encryption processing apparatus 1 can be applied as follows.

For example, there is considered a case in which it is desired to aggregate, from a database in which fields and records are encrypted by TLWE encryption, records each having a specific field within a certain range (for example, a case in which it is desired to obtain an average annual income of 30 to 39 years old).

In this case, the encryption processing apparatus 1 is a database sever that manages the encrypted database, receives a query encrypted by TLWE encryption from a terminal device connected thereto via a network or the like, and returns a response to the query which is encrypted by TLWE encryption to the terminal device.

Since an index cannot be created in the encrypted database, it is necessary to perform comparison and aggregation for the entire database.

The encryption processing apparatus 1 performs a comparison operation that compares all records in the encrypted database with the query by using the functions of the first operation unit 12, the second operation unit 13, the third operation unit 14, the fourth operation unit 15, the fifth operation unit 16, the sixth operation unit 41, the seventh operation unit 42, the first Bootstrapping unit 17, the second Bootstrapping unit 18, and the third Bootstrapping unit 19.

The encryption processing apparatus 1 performs a comparison operation that compares all records in the encrypted database with the query by using the functions of the first operation unit 12, the second operation unit 13, the third operation unit 14, the fourth operation unit 15, the sixth operation unit 41, the seventh operation unit 42, the eighth operation unit 43, the ninth operation unit 44, the first Bootstrapping unit 17, the fourth Bootstrapping unit 51, and the fifth Bootstrapping unit 52.

The encryption processing apparatus 1 performs a comparison operation that compares all records in the encrypted database with the query by using the functions of the first operation unit 12, the third operation unit 14, the fifth operation unit 16, the sixth operation unit 41, the seventh operation unit 42, the tenth operation unit 45, the first Bootstrapping unit 17, the second Bootstrapping unit 18, and the third Bootstrapping unit 19.

The encryption processing apparatus 1 performs a comparison operation that compares all records in the encrypted database with the query by using the functions of the first operation unit 12, the third operation unit 14, the sixth operation unit 41, the seventh operation unit 42, the eighth operation unit 43, the ninth operation unit 44, the tenth operation unit 45, the first Bootstrapping unit 17, the fourth Bootstrapping unit 51, and the fifth Bootstrapping unit 52.

The encryption processing apparatus 1 performs a comparison operation that compares all records in the encrypted database with the query by using the functions of the second operation unit 13, the fourth operation unit 15, the fifth operation unit 16, the sixth operation unit 41, the seventh operation unit 42, the eleventh operation unit 46, the first Bootstrapping unit 17, the second Bootstrapping unit 18, and third Bootstrapping unit 19.

The encryption processing apparatus 1 performs a comparison operation that compares all records in the encrypted database with the query by using the functions of the second operation unit 13, the fourth operation unit 15, the sixth operation unit 41, the seventh operation unit 42, the eighth operation unit 43, the ninth operation unit 44, the eleventh operation unit 46, the first Bootstrapping unit 17, the fourth Bootstrapping unit 51, and fifth Bootstrapping unit 52.

The comparison operation is to perform subtraction between a ciphertext of a record and a ciphertext of a query, and the positive and negative of the subtraction result is equivalent to the comparison operation.

The encryption processing apparatus 1 can further perform an aggregate operation for records that match the query in the comparison operation.

In the aggregate operation, the encryption processing apparatus 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts.

In particular, when a weighted average value is obtained, multiplication between a record and a weighting factor, for example, is required. In a case of using Bit-wise type ciphertexts, it is considered that a full adder operation is frequently used for this processing. If the bit length of an integer to be handled becomes large, the number of required full adders also increases. The four arithmetic operations are homomorphic four arithmetic operations with respect to encrypted numerical values that are regarded as ciphertexts of respective bits when permutation using an input ciphertext is expressed in binary.

The encryption processing apparatus 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Therefore, a query execution time can be significantly reduced.

The four arithmetic operations and comparison between integers are used not only for aggregation in the database described above, but used frequently also in various types of data processing using ciphertexts.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match each other.

In fuzzy authentication and fuzzy search, the encrypted database and the query are compared with each other similarly to the comparison operation and the aggregate operation in the encrypted database described above. At this time, it is necessary to perform the comparison operation using the data encrypted by homomorphic encryption.

When an inner product is obtained as the concordance between presented biometric authentication data and registered biometric authentication data, multiplication needs to be performed.

In addition, the Euclidean distance is often used for comparison in fuzzy authentication and fuzzy search. When the Euclidean distance is calculated, calculation of a square is required. In bit-wise type homomorphic encryption, O $(N^2)$ full adders must be caused to operate with respect to the bit length of data when multiplication is performed. Even in a comparison operation by simple subtraction, it is necessary to operate O (N) full adders. The encryption processing apparatus 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Accordingly, the processing time required for fuzzy authentication or fuzzy search can be largely reduced.

Figure 18:
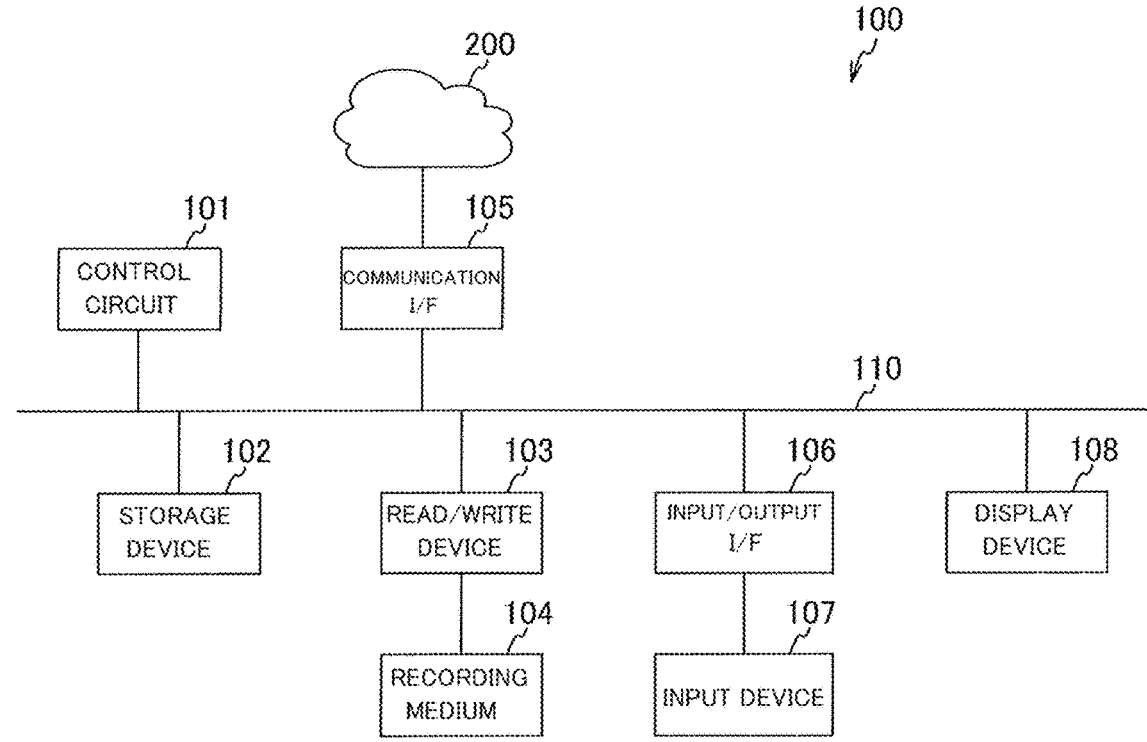
FIG. 18 is a block diagram illustrating an example of a computer apparatus.

FIG. 18 is a block diagram illustrating an example of a computer apparatus.

A configuration of a computer apparatus 100 is described with reference to FIG. 18.

The computer apparatus 100 is, for example, an encryption processing apparatus that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing apparatus 1 can be configured by selecting a part of or all elements from the constituent elements incorporated in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores therein various types of data. For example, the storage device 102 is a memory such as a Read Only Memory (ROM) and a Random Access Memory (RAM), or a Hard Disk (HD) and a Solid State Drive (SSD). The storage device 102 may store therein an information processing program that causes the control circuit 101 to function as the controller 10 in FIG. 1. The storage device 102 functions as the storage unit 20 in FIG. 1, for example.

The encryption processing apparatus 1 loads a program stored in the storage device 102 into a RAM when performing information processing.

The encryption processing apparatus 1 of the first example executes the program loaded to the RAM by the control circuit 101, thereby performing processing that includes at least one of a receiving process, the first operation process, the second operation process, the third operation process, the fourth operation process, the fifth operation process, the sixth operation process, the seventh operation process, the first Bootstrapping process, the second Bootstrapping process, the third Bootstrapping process, and an output process.

The encryption processing apparatus 1 of the second example executes the program loaded to the RAM by the control circuit 101, thereby performing processing that includes at least one of a receiving process, the first operation process, the second operation process, the third operation process, the fourth operation process, the sixth operation process, the seventh operation process, the eighth operation process, the ninth operation process, the first Bootstrapping process, the fourth Bootstrapping process, the fifth Bootstrapping process, and an output process.

The encryption processing apparatus 1 of the fourth example executes the program loaded to the RAM by the control circuit 101, thereby performing processing that includes at least one of a receiving process, the first operation process, the third operation process, the fifth operation process, the sixth operation process, the seventh operation process, the tenth operation process, the first Bootstrapping process, the second Bootstrapping process, the third Bootstrapping process, and an output process.

Alternatively, the encryption processing apparatus 1 of the fourth example executes the program loaded to the RAM by the control circuit 101, thereby performing processing that includes at least one of a receiving process, the first operation process, the third operation process, the sixth operation process, the seventh operation process, the eighth operation process, the ninth operation process, the tenth operation process, the first Bootstrapping process, the fourth Bootstrapping process, the fifth Bootstrapping process, and an output process.

The encryption processing apparatus 1 of the fifth example executes the program loaded to the RAM by the control circuit 101, thereby performing processing that includes at least one of a receiving process, the second operation process, the fourth operation process, the fifth operation process, the sixth operation process, the seventh operation process, the eleventh operation process, the first Bootstrapping process, the second Bootstrapping process, the third Bootstrapping process, and an output process.

Alternatively, the encryption processing apparatus 1 of the fifth example executes the program loaded to the RAM by the control circuit 101, thereby performing processing that includes at least one of a receiving process, the second operation process, the fourth operation process, the sixth operation process, the seventh operation process, the eighth operation process, the ninth operation process, the eleventh operation process, the first Bootstrapping process, the fourth Bootstrapping process, the fifth Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores therein various types of data. The recording medium 104 stores therein an information processing program, for example. For example, the recording medium 104 is a non-volatile memory (non-transitory computer readable medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 communicably connects the computer apparatus 100 and other devices to one another via the network 200. The communication interface 105 functions as the communication unit 25 in FIG. 1, for example.

The input/output interface 106 is, for example, an interface that can be connected to various types of input device in a removable manner. Examples of the input device 107 connected to the input/output interface 106 include a keyboard and a mouse. The input/output interface 106 communicably connects each of the various types of input device connected thereto and the computer apparatus 100 to each other. The input/output interface 106 outputs a signal input from each of the various types of input device connected thereto to the control circuit 101 via the bus 110. The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer apparatus 100 to other devices.

The present embodiment is not limited to the embodiment described above, and various configurations or embodiments can be applied thereto within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing apparatus that processes a ciphertext, the ciphertext being a fully homomorphic ciphertext that has, as a plaintext associated with an integer, a value with an error having a predetermined variance added thereto within a predetermined value range and that is able to be subjected to a predetermined operation between integers without being decrypted, the apparatus comprising a processor that performs a process including:

applying a first polynomial in which all coefficients are the same to an operation result of a homomorphic operation between a ciphertext based on a first ciphertext and a ciphertext based on a second ciphertext, to obtain a third ciphertext indicating a position of a plaintext in the operation result; and applying a predetermined polynomial to a ciphertext obtained by reducing a range of plaintext to a predetermined range in the value range by a homomorphic addition of the third ciphertext to the operation result, to perform an operation between the first ciphertext and the second ciphertext.

2. The encryption processing apparatus according to claim 1, the processor performing the process further comprising:

performing homomorphic addition or homomorphic subtraction of the third ciphertext to or from an operation result of homomorphic addition between the ciphertext based on the first ciphertext and the ciphertext based on the second ciphertext, to obtain a fourth ciphertext for which a range of plaintext has been reduced to a predetermined range in the value range;

performing homomorphic addition or homomorphic subtraction of the third ciphertext to or from an operation result of homomorphic subtraction of the ciphertext based on the second ciphertext from the ciphertext based on the first ciphertext, to obtain a fifth ciphertext for which a range of plaintext has been reduced to the predetermined range in the value range; and performing an operation between the first ciphertext and the second ciphertext by using the fourth ciphertext and the fifth ciphertext.

3. The encryption processing apparatus according to claim 1, the processor performing the process further comprising:

performing homomorphic addition or homomorphic subtraction of the third ciphertext to or from an operation result of homomorphic addition of the ciphertext based on the second ciphertext to the ciphertext based on the first ciphertext, to obtain a fourth ciphertext for which a range of plaintext has been reduced to the predetermined range in the value range;

performing homomorphic subtraction of the first or second ciphertext from the fourth ciphertext or performing homomorphic subtraction of the fourth ciphertext from the first ciphertext to obtain a fifth ciphertext for which a range of plaintext has been reduced to the predetermined range in the value range; and performing an operation between the first ciphertext and the second ciphertext by using the fourth ciphertext and the fifth ciphertext.

4. The encryption processing apparatus according to claim 1, the processor performing the process further comprising:

performing homomorphic addition or homomorphic subtraction of the third ciphertext to or from an operation result of homomorphic subtraction of the ciphertext based on the second ciphertext from the ciphertext based on the first ciphertext, to obtain a fifth ciphertext for which a range of plaintext has been reduced to the predetermined range in the value range;

performing homomorphic addition of the second ciphertext to the fifth ciphertext or performing homomorphic subtraction of the first ciphertext from the fifth ciphertext or performing homomorphic subtraction of the fifth ciphertext from the first ciphertext, to obtain a fourth ciphertext for which a range of plaintext has been reduced to the predetermined range in the value range; and performing an operation between the first ciphertext and the second ciphertext by using the fourth ciphertext and the fifth ciphertext.

5. The encryption processing apparatus according to claim 2, the processor performing the process further comprising:

applying a second polynomial to the fourth ciphertext to obtain a sixth ciphertext;

applying a third polynomial to the fifth ciphertext to obtain a seventh ciphertext; and subtracting the seventh ciphertext from the sixth ciphertext in a homomorphic manner to obtain a ciphertext corresponding to a result of multiplication between plaintexts of the first and second ciphertexts.

6. The encryption processing apparatus according to claim 2, the processor performing the process further comprising:

applying a fourth polynomial having a first coefficient and a second coefficient to the fourth ciphertext to obtain an eighth ciphertext based on the first coefficient and a ninth ciphertext based on the second coefficient;

applying a fifth polynomial having a third coefficient and a fourth coefficient to the fifth ciphertext to obtain a tenth ciphertext based on the third coefficient and an eleventh ciphertext based on the fourth coefficient; and subtracting the tenth ciphertext from the eighth ciphertext in a homomorphic manner to obtain a ciphertext corresponding to upper bits of a result of multiplication between plaintexts of the first and second ciphertexts, and subtracting the eleventh ciphertext from the ninth ciphertext in a homomorphic manner to obtain a ciphertext corresponding to lower bits of the result of multiplication.

7. The encryption processing apparatus according to claim 6, the apparatus further comprising:

a first table in which a calculated value of the first coefficient is stored;

a second table in which a calculated value of the second coefficient is stored;

a third table in which a calculated value of the third coefficient is stored; and a fourth table in which a calculated value of the fourth coefficient is stored; wherein the processor performs the process further comprising:

referring to the first table and the second table at the same time by applying the fourth polynomial to the fourth ciphertext, to obtain the eighth ciphertext or the ninth ciphertext; and referring to the third table and the fourth table at the same time by applying the fifth polynomial to the fifth ciphertext, to obtain the tenth ciphertext or the eleventh ciphertext.

8. The encryption processing apparatus according to claim 1, the processor performs the process further comprising:

dividing a coefficient in the first ciphertext by 2 to obtain the ciphertext based on the first ciphertext; and dividing a coefficient in the second ciphertext by 2 to obtain the ciphertext based on the second ciphertext.

9. The encryption processing apparatus according to claim 1, wherein the ciphertext based on the first ciphertext is a first ciphertext, a coefficient in the third ciphertext is divided by 2, to obtain a new ciphertext as the third ciphertext, the ciphertext based on the second ciphertext is a second ciphertext, and a coefficient in the fourth ciphertext is divided by 2, to obtain a new ciphertext as the fourth ciphertext.

10. The encryption processing apparatus according to claim 1, further comprising a calculation unit configured to apply a predetermined polynomial to a ciphertext to obtain a new ciphertext, wherein the calculation unit performs a process of reducing number of coefficients in a ciphertext as input before applying the predetermined polynomial to the ciphertext as input to obtain the new ciphertext.

11. The encryption processing apparatus according to claim 1, comprising performing the predetermined operation to perform a process involved in fuzzy authentication or fuzzy search using the ciphertext input thereto.

12. The encryption processing apparatus according to claim 1, comprising performing the predetermined operation to process a query based on the ciphertext input thereto for an encryption database.

13. An encryption processing method, executed by a processor, of processing a ciphertext, the ciphertext being a fully homomorphic ciphertext that has, as a plaintext associated with an integer, a value with an error having a predetermined variance added thereto within a predetermined value range and that is able to be subjected to a predetermined operation between integers without being decrypted, the method comprising:

applying a first polynomial in which all coefficients are the same to an operation result of a homomorphic operation between a ciphertext based on a first ciphertext and a ciphertext based on a second ciphertext, to obtain a third ciphertext indicating a position of a plaintext in the operation result; and applying a predetermined polynomial to a ciphertext obtained by reducing a range of plaintext to a predetermined range in the value range by a homomorphic operation of the third ciphertext to the operation result, to perform an operation between the first ciphertext and the second ciphertext.

14. A non-transitory computer-readable recording medium storing a program for causing a processor to perform an encryption process of processing a ciphertext, the ciphertext being a fully homomorphic ciphertext that has, as a plaintext associated with an integer, a value with an error having a predetermined variance added thereto within a predetermined value range and that is able to be subjected to a predetermined operation between integers without being decrypted, the program comprising:

applying a first polynomial in which all coefficients are the same to an operation result of a homomorphic operation between a ciphertext based on a first ciphertext and a ciphertext based on a second ciphertext, to obtain a third ciphertext indicating a position of a plaintext in the operation result; and applying a predetermined polynomial to a ciphertext obtained by reducing a range of plaintext to a predetermined range in the value range by a homomorphic addition of the third ciphertext to the operation result, to perform an operation between the first ciphertext and the second ciphertext.

* * * * *